United States Patent [19]
Sorrells et al.

[11] Patent Number: 6,144,953
[45] Date of Patent: Nov. 7, 2000

[54] TIME-CONSTRAINED INFERENCE STRATEGY FOR REAL-TIME EXPERT SYSTEMS

[75] Inventors: Mark E. Sorrells, Indialantic; John M. Dixon, West Melbourne, both of Fla.

[73] Assignee: Harris Corporation, Melbourne, Fla.

[21] Appl. No.: 06/865,100

[22] Filed: May 20, 1986

Related U.S. Application Data

[63] Continuation-in-part of application No. 06/776,020, Aug. 15, 1985, Pat. No. 4,704,735.
[51] Int. Cl.[7] ..................................................... G06F 17/00
[52] U.S. Cl. .................................. 706/60; 706/45; 706/59
[58] Field of Search .................................. 364/4, 78, 468, 364/200, 900, 513; 706/45, 59, 60

[56] References Cited

U.S. PATENT DOCUMENTS

| | | | |
|---|---|---|---|
| 4,543,630 | 9/1985 | Neches | 364/200 |
| 4,591,983 | 5/1986 | Bennett et al. | 364/478 |

OTHER PUBLICATIONS

Barr et al, *The Handbook of Arificial Intelligence* pp. 155–163 and 184–193.

Primary Examiner—Bernarr E. Gregory
Attorney, Agent, or Firm—Allen, Dyer, Doppelt, Milbrath & Gilchrist, P.A.

[57] ABSTRACT

Expert systems often must be operated under constraints of time or other computer resources. In the past, this has created significant problems since conventional "depth-first" systems will often not be able to arrive at a satisfactory response, or even any response at all, within the limitations of the constraint. Accordingly, an expert system control process and an associated inference network are provided which assign merit values to each inference node (i.e. each proposition) of the inference network. These merit values reflect the processing cost of expanding a node to calculate a likelihood value for the proposition that the node represents. The merit values are then used in the control process to determine which of the nodes will be processed first to calculate likelihood values. In this way, a "best-first" control process is provided which takes account of the actual processing cost of each node in the inference network to establishing which nodes are, in fact, "best" to evaluate first. The processing cost can reflect real-time, processor time or other resources of the computer system which will be consumed in processing respective nodes.

15 Claims, 5 Drawing Sheets

TIME-CONSTRAINED INFERENCE STRATEGY FOR REAL-TIME EXPERT SYSTEMS

This application is a continuation-in-part application of application Ser. No. 06/776,020 filed on Aug. 15, 1985, now U.S. Pat. No. 4,704,735.

BACKGROUND OF THE INVENTION

The present invention relates generally to a control process for expert systems, and, more particularly, to an expert system control process for resolving problems in time-constrained situations.

In certain applications, a significant need exists for expert systems which can operate to provide satisfactory decisions in critically time-constrained situations. This is often the case in military applications. Although the invention is certainly not limited to military applications, the following discussion will pertain to a military situation for purposes of example only. For example, in advanced avionics applications, it would be very desirable to have an intelligent system to assist pilots in making in-flight tactical decisions. In combat situations, pilots face severe workload stress in terms of the magnitude, diversity, and speed of the required decisions. Furthermore, pilots are overwhelmed by the quantity of incoming data and communications upon which they must base life-critical decisions.

Pilots are confronted with numerous dynamically changing situations, each of which requires precise activation of one of the dozens of switches, buttons, and knobs covering their controls. While each of the aircraft's hundreds of components and systems serve legitimate purposes, the technologies which created them have outpaced the technology for intelligently interfacing these systems to the pilot.

In order to support the next generation of advanced single-pilot helicopters and aircraft, the technology must be developed to provide intelligent information processing capabilities in the cockpit. These intelligent processing systems will off-load lower-level decision-making tasks from the pilot and provide tactical advisories in various situation assessment tasks. The resulting cockpit environments will be characterized by enhanced, efficient performance and reduced pilot workload.

Emerging techniques in knowledge-based expert systems are providing the solution to this dilemma by developing methods for representing and applying knowledge stored in a computer to solve problems that are generally thought to require significant human expertise (e.g. see Davis, R., "Expert Systems: Where Are We? And Where Do We Go From Here?", A.I. Magazine, Spring 1982, which is hereby incorporated by reference). These knowledge-based expert systems will complement the pilot's performance by off-loading lower-level tasks so that the pilot may concentrate on higher-level tactical and strategic objectives.

Although expert system technology has been evolving since the mid 1960's, the development of expert systems for time-constrained environments is still in its infancy. Referring to a military example, the real-time cockpit requirements for knowledge-based decision aids introduce several areas of expert system technology requiring further research and development. State-of-the-art expert systems have not yet confronted real-time constraints either in military situations or elsewhere. Typically, in the past, real-time performance and expert systems have not been considered in the same system.

An "expert system" is an intelligent computer program that uses knowledge and inference procedures to solve problems that are difficult enough to require significant human expertise. An expert system consists of:

(1) A knowledge base of domain facts and heuristics associated with the problem. The facts constitute a body of information that is widely shared, publicly available, and generally agreed upon by experts in a field. The "heuristics" are mostly private, little-discussed rules and strategies of good judgment, plausible reasoning, and good guessing that characterize expert-level decision-making and drastically limit search in large problem spaces. This knowledge is used by the system in reasoning about the problem.

(2) A control structure for symbolically processing and utilizing the information stored in the knowledge base to solve the problem. This control structure is also commonly referred to as the inference engine.

(3) A global data base to serve as a working memory to keep track of the problem status, input data, and relevant facts and history of the solution progression.

(4) Explanation systems to allow the user to challenge and examine the reasoning process underlying the system's answers. This includes a user friendly interface to facilitate user interaction with the system.

(5) Knowledge acquisition system to facilitate the addition of new knowledge into the system. Knowledge acquisition is an ongoing process, thus the knowledge must evolve over time through several iterations of trial and error. This interactive transfer of expertise from a human expert to the expert system is required in order to achieve an operationally acceptable level of performance.

The fundamental structure of an expert system is shown in FIG. 1. The major architectural distinction between a knowledge-based expert system and a conventional computer program is that an expert system maintains a clear, distinct separation between the general knowledge about the problem (knowledge base 10) and the reasoning mechanisms for symbolically applying this knowledge (control structure 12). Instead of being programmed to follow step-by-step procedures, an expert system employs a few general problem-solving procedures for symbolically applying knowledge and heuristics to find solutions to general classes of problems. As shown in FIG. 1, input data 16 is coupled to the control structure 12 and the knowledge base 10 through the global data base 14. A user interfaces with the expert system through the natural language interface 18.

Over the past decade, several Artificial Intelligence (A.I.) research groups have built highly specialized knowledge-based expert systems for a variety of domains (e.g. medicine, chemistry, geology, computer configurations, electronic fault diagnosis, etc.). The number of organizations developing expert systems has grown sharply over the past five years. Furthermore, research has rapidly spread and intensified in academia, spurred by this influx of industry and government funds. Researchers have recognized the potential applicability of expert systems for a wide variety of applications. However, this research still has not addressed the real-time constraints prevalent in military applications.

Previous university and industrial research activities addressing real-time constraints have focused on developing faster symbolic processing machines and multi-processing architectures (e.g. see Halstead, R. H., "Multilisp: A Language for Concurrent Symbolic Computation", MIT Laboratory for Computer Science, August 1984, which is hereby incorporated by reference). Present-day expert systems claim real-time performance simply by virtue of their application domain being small enough not to require sophisticated processing. However, using conventional expert system inferencing techniques on these enhanced architectures will require that an upper bound be placed on the size of the knowledge base to ensure real-time processing. This upper limit on the size of a knowledge base is unacceptable for most military applications since the knowledge base is expected to grow and expand over time. The complexity of military scenarios and other complex situations mandates that a new generation of expert system inferencing techniques be developed to efficiently process these knowledge bases in real-time.

The present inventors have recognized that faster machines and limited domains do not satisfy the technology requirements for real-time expert systems. Accordingly, they have undertaken research to address the problem-solving paradigms that enable time-constrained decisions-making in complex situations.

Traditional expert system control strategies may fail to provide responses in time-stressed scenarios. Most expert system control strategies employ a depth-first search through a knowledge base in order to reach a decision. However, in a time-constrained environment such as that found in many military situations, this depth-first traversal is not guaranteed to achieve a reliable solution, or more importantly any solution at all.

An expert system control strategy contains the problem solving mechanisms for symbolically processing and utilizing the information stored in the knowledge base to solve problems. Two reasoning mechanisms are commonly used in expert systems, either alone or in combination, to process the knowledge base. These mechanisms are:

(1) forward-chained (data-driven) inferencing; and
(2) backward-chained (goal-driven) inferencing.

The specific implementation of a reasoning mechanism depends on the nature of the problem and the representation of the knowledge being manipulated.

When data or basic ideas serve as a starting point, then forward-chaining is the natural direction for the problem solution. In these data-driven inferencing systems, the system reasons forward from the facts to a solution by repeatedly evaluating the antecedents of all rules in the knowledge base until a steady-state condition is reached. However, these forward-chained systems may never terminate if the initial evidence does not lead to a conclusion. Thus, accordingly, most expert systems in practice tend to be goal-driven.

When a goal state or hypothesis serves as an initial focus point, then the inverses of inference rules are applied to find a path back to the initial state. In this goal-directed inferencing scheme, the system works backward from a hypothetical solution (goal) to find evidence supporting that goal. Backward-chaining is applicable to most diagnosis and planning problems.

This backward-chained inferencing strategy explores each potential hypothesis in order of likelihood. The system searches the knowledge base for a rule(s) whose consequent matches the desired conclusion. The system then attempts to recursively verify each resulting rule in turn until the antecedent part of the rule matches the initial problem description stored in the global data base. Each hypothesis is explored until all hypotheses have been exhausted. The system then ranks the hypotheses by the degree to which they are supported by the evidence and presents the resulting conclusion to the user.

The limitation, however, of this depth-first backward-chained inferencing strategy is that the evaluation of the knowledge base is independent of the amount of processing time available in the given scenario. In time-stressed scenarios, the system might inappropriately plunge depth-first into an insignificant path of reasoning and not achieve a solution within the bounded response time. Traditional expert system inferencing strategies contain no focusing mechanism to identify the most influential, cost-effective knowledge to evaluate in the knowledge base. Thus, these traditional inferencing strategies are inappropriate for time-constrained decision-making domains.

SUMMARY OF THE INVENTION

Accordingly, it is an object of the present invention to provide an expert system control process which allows for improved operation in a time-constrained environment.

A further object of the present invention is to provide an expert system control process which is particularly useful in time-constrained situations for resolving problems in a manner similar to that which would be used by a human expert faced with these time constraints.

To accomplish these and other objects, the inventors have developed an expert system inferencing strategy to provide reliable responses in time-constrained situations. This research and development has focused on the problem-solving paradigms which lead to reliable time-constrained decisions. In particular, they have constructed an expert system control strategy resembling the way an expert in the field reasons about time-constrained situations. This inferencing strategy considers the most influential pieces of data first, and less significant data as time permits. The significance of a piece of knowledge is determined by the potential change in the final decision resulting from evaluation of that node. Thus, the rule which appears most likely to alter the final conclusion is tested first and less significant data is examined as time permits. The level of belief in the final conclusion is proportional to the amount of processing time for the given scenario. Thus, this inferencing mechanism adjusts the decision-making process based upon the immediacy of the required solution. In short, the optimality of the solution is appropriately dependent upon the processing time available in the given scenario.

To accomplish this "best first" approach, merit values (e.g. see Slagle, J. R. and Halpern, E., "An Intelligent Computer Strategy for Computer Consultation", NRL Memorandum Report 4789, April 1982, which is hereby incorporated by reference) are assigned to each of the propositions (nodes) of the inferencing network to guide the search. These merit values are based on the degree of influence which the particular node has on the top node of its particular inferencing network and the processing cost of evaluating the particular node. A "best first" algorithm is then applied based on the merit values so that the best data can be evaluated first to give a decision based on the best data within the time limitations imposed. The certainty of the expert system response increases in proportion to the amount of processing time available.

DETAILED DESCRIPTION

Basically, the present inventors have developed a time-constrained inference network to provide reliable expert system responses for applications where significant real-time constraints exist. Particularly, a deep-level inference network to represent domain knowledge, similar to the partitioned semantic network in the PROSPECTOR system (e.g. see R. O. Duda et al, "Development of the PROSPECTOR Consultant System for Mineral Exploration", Final Report for SRI Projects 5821 and 6415, Artificial Intelligence Center, SRI International which is hereby incorporated by reference), has been implemented to support time-constrained decision-making and additionally provide a mechanism for the propagation of dynamically changing data. A military application will be given as an example, although the invention is not limited to this, and can be practiced in any situation where a time-constrained decision must be made using an expert system.

Figure 1:
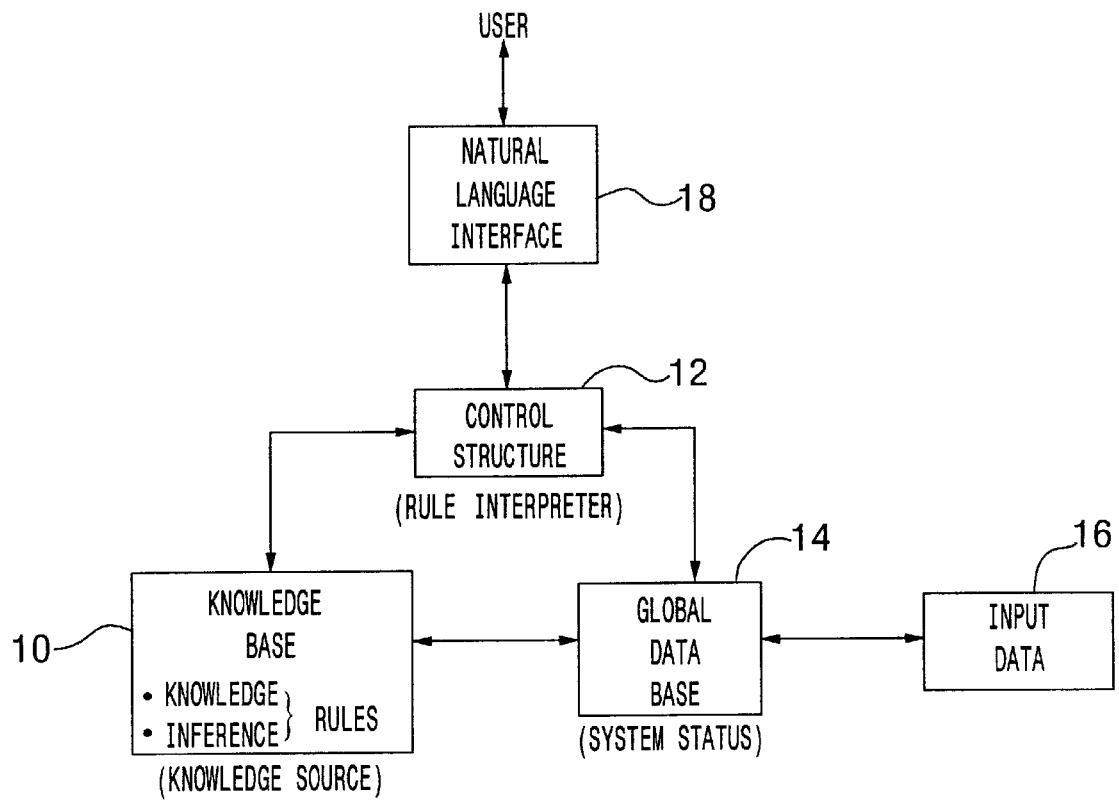
FIG. 1 shows the basic structure of an expert system employing the control process of the present invention.

Referring to FIG. 1, the knowledge base 10 for this inference network is represented as a set of propositions. Each proposition has an associated numeric value representing its likelihood (i.e. the relative significance of processing that node). Initially, a default value is assigned to each proposition in setting up the knowledge base to represent an estimate of the likelihood. As will be explained later, the propostion's value will subsequently be calculated during processing of given problems to establish a value other than the estimated default value. A proposition may have antecedent propositions from which its value may inferred, and may itself be an antecedent of consequent propositions.

Figure 2:
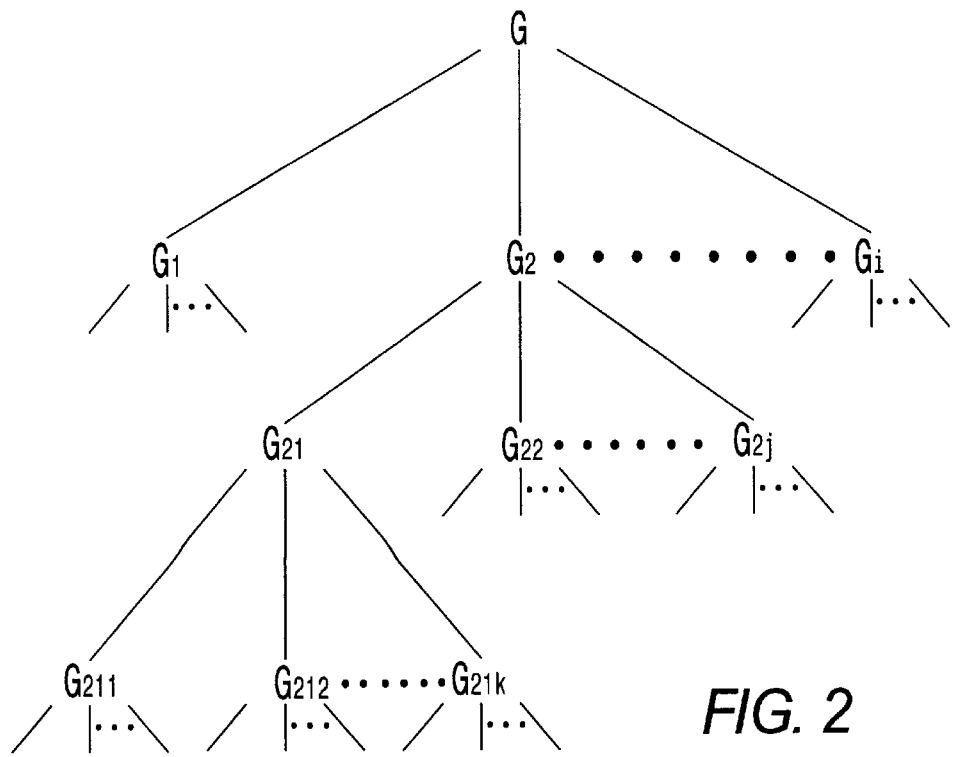
FIG. 2 shows an inference network used in the control process of the present invention.

Each proposition is represented as a node in the inference network as shown in FIG. 2. The top node G represents the final conclusion of the expert system. The other nodes in the system below the top node G represent individual propostions related to the top node and possess associated values. Using backward-chained inferencing, the top node represents a basic proposition which the user wishes to have the expert system's likelihood estimate on. The nodes below this represent other propositions which the knowledge base programmer establishes as affecting the proposition of the top node. Generally, a knowledge base will have several top nodes since, obviously, it will be desired to analyze a number of different propositions. In fact, depending on the information sought by the user, any node in the system can become a top node if the user designates that particular proposition as the information he wants evaluated. The nodes which affect this designated proposition then become the lower nodes in the inference network. The leaf nodes in the network are referred to as terminal nodes whose values are retrieved from sensor data and user input.

Links (or "edges") in the inference network connect the proposition nodes together. These links (inference rules) define the implications for organizing the network into antecedent-consequent relationships, thus allowing for the propagation of information.

Assignment in the network is the process by which the value associated with a node is determined from the values associated with its antecedents. The inference links specify how the probability of a consequent proposition is assigned based upon the probabilities of its antecedent propositions. The arguments to the assignment function correspond to the antecedents of that node. Propagation involves a sequence of assignments initiated at any node and continues through the consequents of that node until the top proposition is reached.

A real-time inferencing strategy has been developed by this invention to focus the solution path on the most influential node in the network with the least associated processing cost. This inferencing strategy utilizes a best-first search algorithm to select the most "meritorious" proposition at any level in the inference network to process. A control mechanism utilizing these merit values has been developed to ensure that the most relevant facts are considered in a cost-effective prioritized manner and thus, guarantees a reliable response within the given time constraint.

Figure 3:
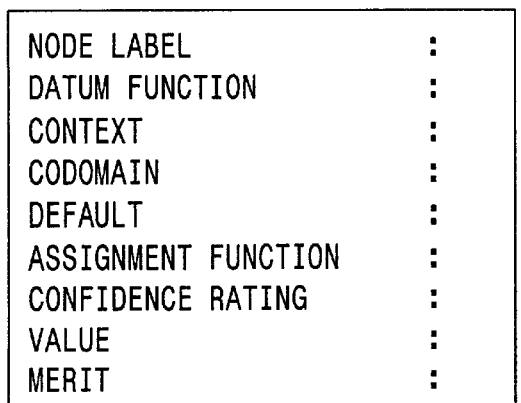
FIG. 3 shows an individual network node of the inference network of FIG. 2.

Each node in the inference network of FIG. 2 is represented in the format illustrated in FIG. 3. As seen there, each node contains the following:

NODE LABEL: The node label specifies the unique name for the node. It is formed by concatenating the datum function with the particular context.

DATUM FUNCTION: The datum function is a function whose domain is a set of contexts and whose codomain is any set of numbers.

CONTEXT: The context is a set of variables upon which the value of a node depends. The context specifies the domain for the datum function. Propositions with no particular context are global contexts or terminal nodes and are independent of antecedent propositions.

CONDOMAIN OF DATUM FUNCTION: The codomain of a datum function is any specified set of numbers. For a probablistic datum fucntion, this numeric value can fall between zero and one or can fall between negative one and positive one similar to probabilistic certainty functions in the EMYCIN system (e.g. see B. G. Buchanan et al, *Rule-Based Expert Systems,* Addison-Wesley, 1984 which is hereby incorporated by reference). A descriptive datum function represents a physical attribute of an object and may assume any value.

DEFAULT: Each node in the inference network has an associated default value that the assignment function returns when no antecedent values are supplied. The default value is the a priori value of a node and msut belong to the codomain of the datum function. As noted earlier, this will only serve as the node's value until the node is expanded (i.e. processed or evaluated) in light of the particular circumstances the user has provided to give the node's value. This default value may be context sensitive and may be derived by a bounded set of production rules.

ASSIGNMENT FUNCTION: The assignment function specifies how the value associated with a node is to be computed based upon the values associated with its antecedent's. The arguments to the assignment function correspond directly to the values of the antecedents of the node. The assignment functions consist of the Bayesian logical connectives (AND, OR and NOT) and any expert-defined linearly differentiable function.

OR Assignment Function

OR $(x,y, \ldots, z)=1-[(1-x)(1-y) \ldots (1-z)]$

The OR assignment function assigns the product of the complement probabilities of the antecedents to the complement of the consequent.

AND Assignment Function

AND $(x,y, \ldots, z)=(x)(y) \ldots (z)$

The AND assignment function assigns the product of the probabilities of the antecedents to the consequent.
NOT Assignment Function
NOT (x)=(1−x)
The NOT assignment function assigns the complement of the probability of the antecedent to the consequent.
EXPERT-DEFINED Assignment Function The EXPERT-DEFINED assignment function allows the expert to define a differentiable mathematical function for combining the values of antecedents to compute the value of a consequent. EXPERT (x,y, . . . z)=f(x,y, . . . , z) must be defined by the expert such that f'(x,y, . . . , z) exists.

CONFIDENCE RATING: The inference rules associated with the assignment function may themselves contain uncertainty. A numeric procedure has been developed to indicate the confidence rating of the expert in each particular assignment function. The confidence rating is a number between 0 and 1 associated with each assignment function to indicate the degree of belief in the consequent when the antecedents are known to be true (i.e. one—see Cohen, P. R., and Grinberg, M. R., "A Theory of Heuristic Reasoning about Uncertainty", A. I. Magazine, Summer 1983, which is hereby incorporated by reference). These confidence ratings are combined and propagated through each consequent assignment function. This use of a confidence rating is similar to the use of a certainty factors in the MYCIN system (e.g. see B. G. Buchanan et al, *Rule-Based Expert Systems,* Addison-Wesley 1984). A generalization of Bayes' theorem is utilized to derive the confidence rating of nodes in the inference network. Whereas Bayes' theorem requires masses of statistical data, the generalization of this theorem utilizes subjective expert judgment in its place. Thus the domain expert must initially specify the confidence rating of each node. This relaxation of Bayes' theorem requires that the domain expert be consistent and accurate in assignment of confidence ratings throughout the network.

NODE VALUE: The value of a node is a number within the codomain of the datum function and is obtained by applying the assignment function to the node values of its antecedent propositions. The resulting value is combined with the confidence rating of the node to yield the derived degree of belief in the consequent. The combining function for incorporating the confidence rating is specified initially by the domain expert.

TIME-MERIT VALUE: The time-merit value of a node represents the cost-effective influence value that a node has on the top proposition. A high merit value implies that a proposition exerts considerable influence on the top proposition with little associated processing cost. A low merit value indicates that expansion of that proposition will have little effect on the top proposition or that expansion of that node can be accomplished only at a high processing cost. Processing cost is generally defined in terms of the total computer processing time that is required for determining the value of the particular node. This depends both on what antecedent nodes must be processed first to establish the value of the present node, and the particular assignment function of the present node. On the other hand, processing cost is not necessarily limited to this definition, and could be defined to reflect consumption of other resources of the computer system such as memory, input-output channel bandwidth, peripheral device allocation etc. Obviously, the term "processing cost" depends upon the architecture of the particular computer system. For example, in a parallel processing multicomputer system, real computation time may be less than total processor time. Thus, 100 msec. of total processor time could be allocated between ten processors so that the real computation time would only be about 10 msec.

Conversely, in a time-shared uni-processor system 100 msec of processor time might require over 1 sec. of real-time due to the need for sharing processor time with other users. Thus, the term "processing cost" can be a reflection of real-time or actual processor time or some combination of both, depending upon the relative importance of these to the user.

Calculation of merit will now be discussed. As noted previously, the merit value of a node represents the cost-effective influence value that a node exerts on the top proposition in the inference network. Consider the inference network shown in FIG. 2 with top proposition G and antecedents $G_i$. Each subscript indicates an additional level in the inference network. The value stored at $G_i$ is $P_i$. Each value of P is determined by applying the assignment function of a node to the values of its antecedent proposition.

The time-merit of an untried proposition is defined as:

$$\text{MERIT of } G_{ij\ldots st} = \left| \frac{dP}{d(C_{ij\ldots st})} \right|$$

where dP represents the expected change in the node value P of the top proposition G, and $d(C_{ij\ldots st})$ represents the associated processing cost to expand the untried proposition $G_{ij\ldots st}$. The subscript notation "ij . . . st" indicates a multi-level index which identifies the node. For example, $P_{ij}$ is the jth antecedent of $P_i$. The absolute value is taken since both positive and negative changes in the top proposition are of equal impact. Thus, the time-merit value of a proposition G is equal to the absolute value of the expected ratio of the potential change in the node value of the top proposition to the cost of expanding the node G (e.g. the time required to evaluate that node). A more useful and meaningful representation of a time-merit value is derived by applying the chain rule to the time-merit equation:

$$\text{MERIT} = \left| \frac{dP}{d(C_{ij\ldots st})} \right| = \left| \frac{d(P)}{d(P_i)} \times \frac{d(P_i)}{d(P_{ij})} \times \ldots \times \frac{d(P_{ij\ldots st})}{D(C_{ij\ldots st})} \right|$$

The last factor in the chain rule expansion is the only one involving the cost of expanding an untried node, and is termed the "self-merit" of a node. The self-merit indicates the expected change in a proposition's node value $P_{ij\ldots st}$ with respect to the cost of processing the proposition, $C_{ij\ldots st}$. The self-merit value of a node as indicated by this last factor is assigned by the domain expert. The specific scale and units of a self-merit value are not important, as long as they are consistently relative to one another throughout the network. Large self-merit values should be assigned to nodes whose required processing time is short and whose value is likely to change a great deal.

A brief discussion will now be given regarding how the domain expert could go about determining an appropriate self-merit value. Basically, it should be recognized that self-merit is a factored probability parameter, since the numerator term in its derivation is a probability. The denominator term is a cost-constant (or at least a constant cost-estimate). The self-merit value is the expected change in a node's value resulting from evaluation of that node, divided by a factor representing node evaluation cost. The expected change is viewed with respect to the default value for the node.

In the absence of any knowledge about the probability distribution of node values, a default value of 0, representing complete uncertainty, should be chosen. In a boolean logic system nodes would have only two possible values, representing true or false. In a bayesian system, the equivalent values would be 1 or −1, with no in-between values. The bayesian system allows for in-between values as a way of representing uncertainty, but the underlying concept is essentially binary.

Now let's say our expert knows or feels from his experience that a node's value is equally likely to be either −1 or 1 at any given point in time lacking any other knowledge about a specific situation. At the time of determining the self-merit value, we know that node computation time (cost) is, say, 1 unit. Therefore, the only thing remaining to be determined is the expected change in value of the node resulting from the evaluation. Since he doesn't know which value the node will have before computation, he chooses a default value of 0. In this case, the expected change would be 1, as shown from the following calculation:

Expected change = (probability of case 1) ∗

ABS (change for case 1) +

(probability of case 2) ∗

ABS (change for case 2)

= (0.5)1 + (0.5)1 = 1.

The above statement says that the expected change is 1 because there is a 50% probability of a value change (from the default value) of 0 to −1; and there is a 50% probability of a value change from 0 to 1. In either case, the absolute value of the change is 1.

But this is a special case. Consider another example:

The expert knows (or feels) from experience that a particular node is likely to have the value 1 just about all the time—say, 99% of the time. The other 1% of the time it will be −1. He assigns a default value of 1.

Expected change=(0.99)0+(0.01)2+0.02

From the above discussion, the utility of the self-merit term should be more apparent. When the expert has knowledge about the likely evaluation of a node, the self merit value allows expression of that knowledge. In particular, when the expert sees a probability distribution for node values that is strongly asymmetric across the possible range, the system can take advantage of this knowledge to reduce computation time. The asymmetric probability distribution is equivalent to reduced uncertainty and in turn, reduced expected change in node value from the default. Now, like human experts, our expert system can "tend to ignore" certain rules which "usually" yield the same value.

Each of the remaining factors in the chain rule expansion of the merit function is a link-merit, which indicates the change in the node value of a consequent proposition due to the change in the node value of an antecedent proposition. The link merit corresponds to the degree of influence exerted by an antecedent on its direct consequent. The link merit is calculated by differentiating the assignment function associated with the link connecting the antecedent/consequent pair with respect to the given antecedent. Examples of different types of link merits are as follows: AND Link Merit: A consequent whose truth value is dependent upon verification of all its antecedents is the logical AND of those antecedents. Assuming all antecedents are independent, then a probablistic analysis describes the AND function as:

$P(H)=P(A_1)P(A_2) \ldots P(A_n)$

Thus, the probability assigned to a consequent, H, given the current probabilities (values) for each of its antecedents $A_i$ (i=1, . . . , n) is the product of the antecedent probabilities. Differentiating the consequent probability with respect to a single antecedent and substituting, the AND Link Merit is derived as:

$$\frac{dP(H)}{dP(A_i)} = \frac{P(H)}{P(A_i)}$$

The AND link-merit states that the power of an antecedent to change its hypothesis probability is inversely proportional to that antecedent's probability. Thus the antecedent of lowest probability has the highest link-merit value among all antecedents of an AND Proposition. Intuitively, the antecedent with the lowest probability is the one primarily responsible for holding down the consequent probability of an AND link.

OR Link Merit: The OR function is logically true when any of its antecedents are true. Assuming independence of antecedents, then the probablistic OR function is written as:

$P(H)=1-((1-P(A))(1-P(A2)) \ldots (1-P(A_n))$

The consequent probability is the complement of the product of the complements of all the antecedent probabilities. Differentiating with respect to an individual antecedent and substituting, the OR link-merit function is derived as:

$$\frac{dP(H)}{dP(A_j)} = \frac{1-P(H)}{1-P(A_j)}$$

The OR Link-merit states that the power of an antecedent to change its consequent probability is inversely proportional to the complement of that antecedent's probability. Thus, the antecedent of highest probability has the greatest link-merit of all the antecedents of an OR node.

NOT Link Merit: The logical NOT is defined as:

$P(H)=1-P(A)$

A subscript is not required since a NOT link has only one antecedent. The link merit of the NOT function is derived as:

$$\frac{dP(H)}{dP(A)} = -1$$

In summary, the time-merit value of a node in the inference network is the product of all of the link merits on all of the nodes directed from the node to the top proposition, multiplied by the self-merit value of that node. The merit values for the nodes are used in conjunction with a "best-first" algorithm in a manner which will be discussed below to operate within given time-constraints. Regarding the calculation of merit values in general, it should be realized that the initial calculations for merit value assignments are based on the assigned default values given to each node. Thus, referring to FIG. 3, an initial merit for each node is provided based on the assigned default values. However, during processing values of antecedent nodes will change as actual calculated values replace default values. Thus, the respective merit values for the nodes will also change since the merit of any given node will depend on the values of its antecedent nodes.

The control strategy for searching through the inference network utilizing a best-first algorithm based on time-merit values to select the most cost-effective influential proposition at any level in the network to evaluate will now be discussed. The inference strategy continuously updates the nodes values for the top propositions. When the available processing time is about to expire, the default values for all non-evaluated propositions are applied in all active assignment functions and the resulting node values are propagated through the inference network to yield the final result in a bounded time.

This inferencing strategy employs a two step algorithm to select the next proposition for evaluation:

1. The system identifies the untried proposition with the largest merit value on the tree (i.e. the inference network) and calculates the merit values for all of its children (i.e. expands the identified node to all of its antecedent nodes).
2. At each level, the best time-merit value is backed up to the top proposition. At the top level, the untried position with the highest merit value is identified and evaluated.

The overhead computation time for evaluation time-merit values is proportional to tree depth rather than tree size, since only the time-merits of the newly expanded node are computed and backed up. This best-first strategy is analogous to moving up a tree of winners. A cutoff merit value may be used to limit or increase the total number of nodes investigated. Only those nodes with a time-merit value above the cutoff will be investigated. This cutoff merit value does not alter the order in which nodes are investigated, only the total number of nodes investigated. If no propositions remain with a merit value above the cutoff value, then traversal of the inference network is complete.

This inference strategy ensures that the most significant data is processed first in a prioritized manner. At any instant, the current node value of the top proposition represents the most reliable estimate of the actual conclusion that can be made within the given time constraint. The level of confidence in the estimated node value of the top proposition increases in proportion to the amount of processing time utilized.

Description of a Prototype Embodiment

An example of the present invention will now be given by describing a prototype expert system for tactical weapon-to-threat assignment (e.g. see Callero, M., Jamison, L., and Waterman, D. A., "TATR": An Expert Aid for Tactical Air Targeting", RAND Corporation, January 1982; and Slagle, J. R., Cantone, R., and Halpern, E., "BATTLE": An Expert Systems for Fire Support Command and Control", NRL Memorandum Report 4847, July 1982, which are hereby incorporated by reference). This avionics application is a well-bounded weapon-to-threat assignment domain which clearly illustrates the requirements for time-constrained expert system decision making. The real-time aspect of this weapon-to-threat assignment problem requires that weapon deployment responses be made to the pilot within an acceptable response time for each threat scenario.

Figure 5A:
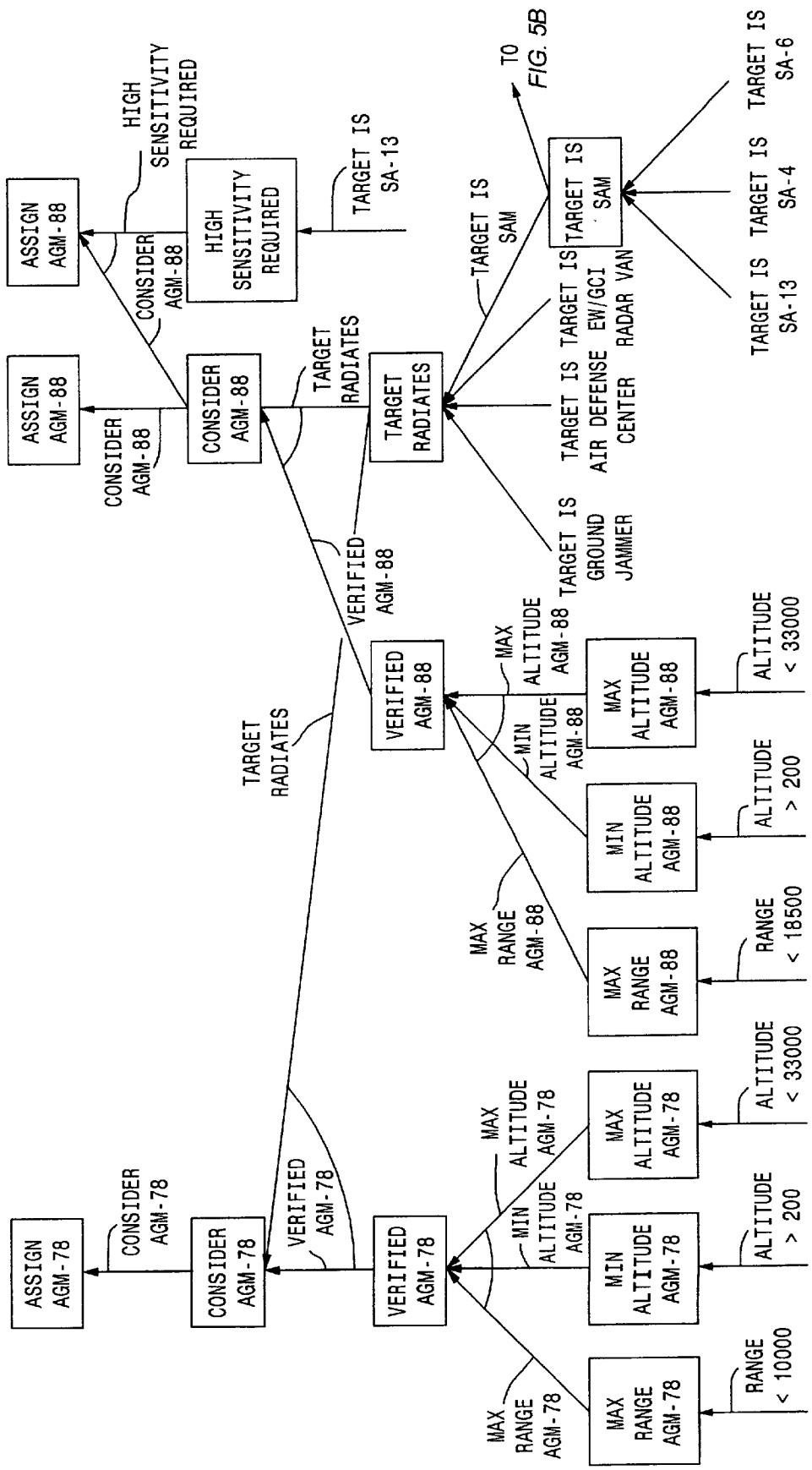
FIGS. 5a and 5c show the arrangement of the rules of the knowledge base shown in Appendix 4 for the prototype expert system of FIG. 4.
Figure 5B:
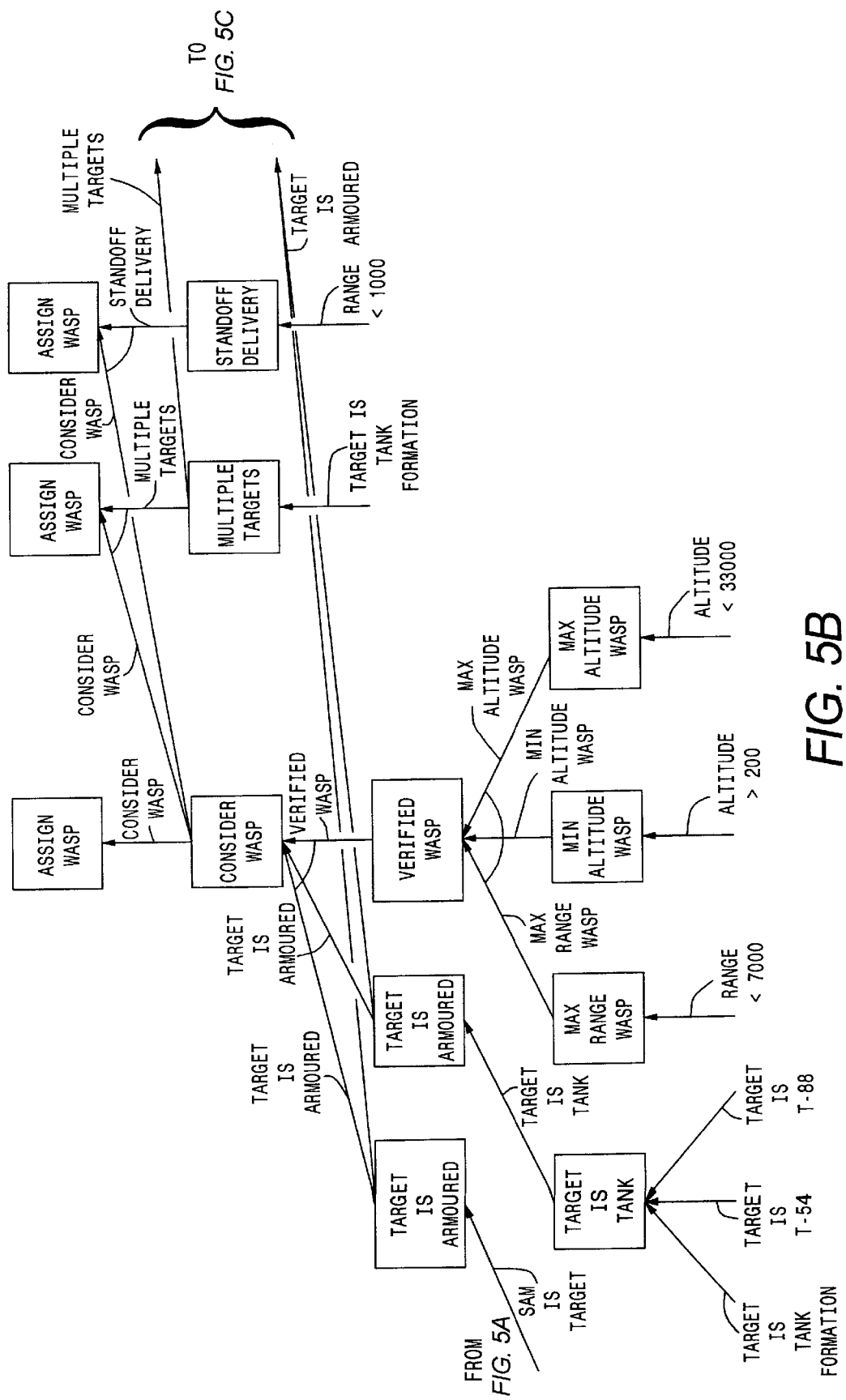
Figure 5C:
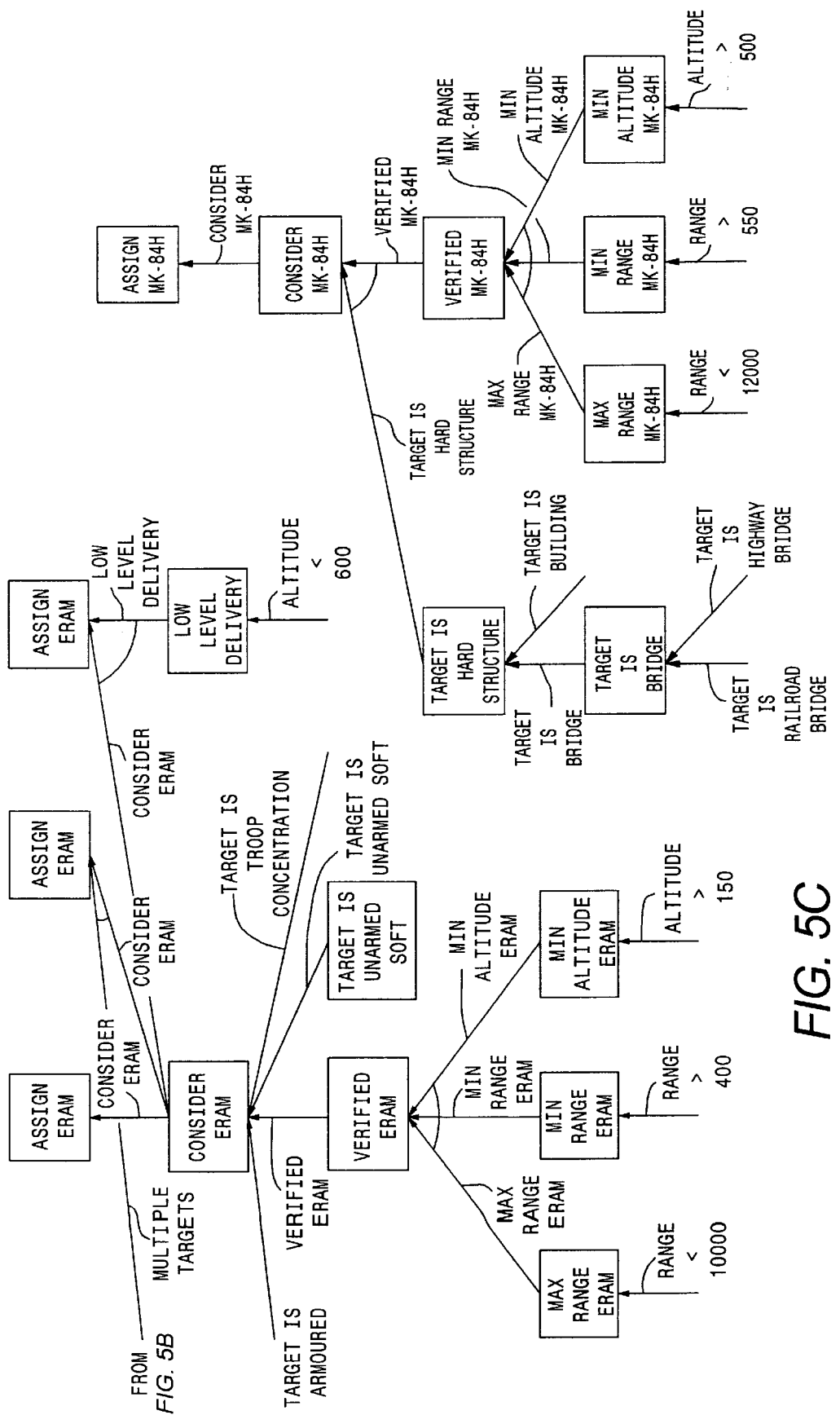

This prototype expert system provides reliable time-constrained tactical weapon deployment advisories to pilots by assimilating:

mission profile data;
target/threat sensor data;
weapon availability data;
aircraft monitoring data;
environmental data; and
weapon-to-threat assignment knowledge A model knowledge base for this weapon-to-threat assignment domain has been constructed to provide realistic responses. The knowledge base contains the domain specific facts, rules, and heuristics associated with weapon-to-threat assignment. The focus of this example is centered on development of a real-time control strategy rather than on a sophisticated knowledge base for weapon-to-threat assignment. Thus, a representative subset of weapons, targets, threats, and assignment strategies has been selected. These weapons, targets, and threats selected are typical of more complex scenarios. Appendix 1 represents weapon stores for the prototype system while Appendix 2 represents the potential targets and their threats to be encountered. Appendix 3 shows the weapon-to-threat effectiveness matrix used for the prototype, thereby illustrating which weapons are effective for given targets. Appendix 4 lists the rules of the knowledge base. FIGS. 5a to 5c represent a graphic illustration of Appendix 4.

The weapon-to-threat assignment knowledge for this model knowledge base was collected from various books and references, such as Janes' Weapon Systems. Future expert level performance can arise from collecting an extensive set of weapon and threat knowledge, rather than a large collection of domain independent methods. The development process for this prototype expert system for weapon-to-threat assignment is composed of seven phases:

(1) Requirements Specifications;
(2) Design of time-Constrained Inference Strategy;
(3) Knowledge Engineering;
(4) Implementation of Real-Time Expert System;
(5) Refinements and Demonstration;
(6) Implementation of Traditional Control Strategy; and
(7) Comparison and Evaluation of Time-Constrained versus Traditional Expert System Inference Strategy Weapon-to-threat assignment is a critical function for pilots requiring many complex time-constrained decisions involving evaluation of the battlefield scenario to determine the importance of enemy targets and threats, selection of appropriate targets and threats to attack, and assignment of suitable weapons and tactics to attack those targets and threats. The weapon-to-threat assignment decision results from time-constrained human judgements integrating the many factors regarding enemy target/threat capabilities, weapon system effectiveness, and the battlefield scenario. The dynamic stressful cockpit environment requires that critical real-time choices be made among the various alternatives.

Figure 4:
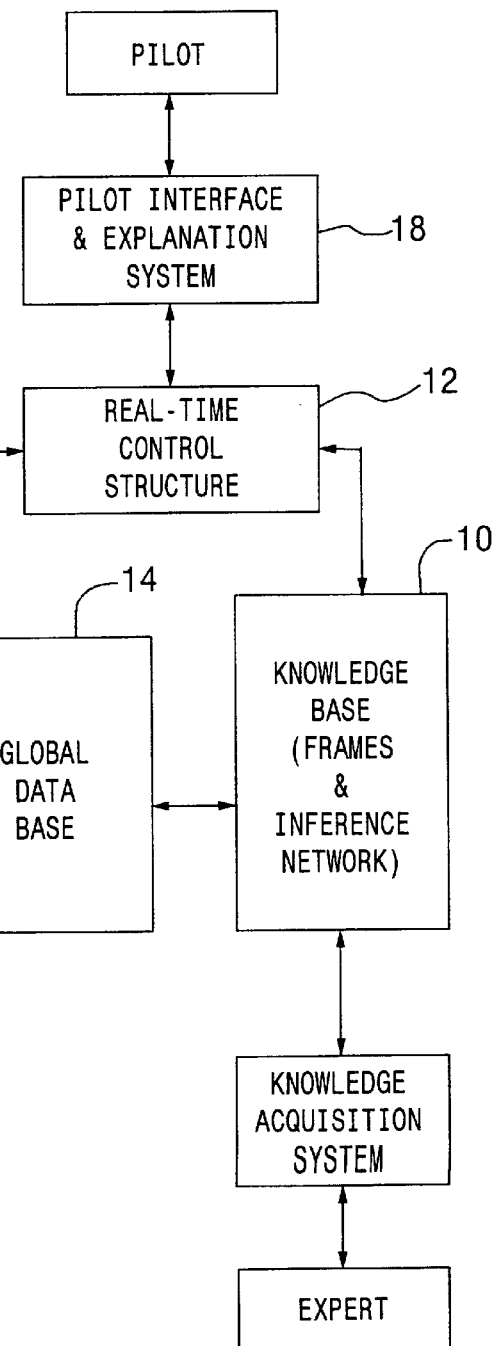
FIG. 4 shows a prototype expert system for weapon-to-threat assignment as an example of utilizing the control process of the present invention.

This prototype expert system, illustrated in FIG. 4, receives input information from five primary sources. This information includes:

(1) Weapon Stores data;
(2) Pre-processed target and threat sensor data;
(3) Mission profile and tactics data;
(4) Environmental data for the battlefield scenario; and
(5) Aircraft monitoring data.

The output of this expert system is a recommendation to the pilot regarding the optimal weapon deployment response for the existing threat scenario. The response time of the system is bounded by a maximum acceptable value dependent upon the lethality of the threat scenario. The ultimate weapon deployment decision resides with the pilot.

The knowledge base 10 for this prototype expert system contains the domain specific facts, rules, and heuristics associated with weapon-to-threat assignment. In particular, the knowledge base 10 contains specific knowledge regarding weapon characteristics and capabilities (Appendix 1), target and threat characteristics (Appendix 2), and weapon assignment rules and heuristics (Appendices 3 and 4). The target/threat sensor information, as well as the heuristic procedures for weapon-to-threat assignment are incomplete and inexact. This prototype system is designed to accommodate and propagate uncertainty in sensor data and inference rules. Associated with each recommendation to the pilot is a confidence rating to express the "level of belief" associated with the recommendation based upon the certainty of the input data and the heuristics utilized in the time-constrained inference strategy.

The time-constrained inference network described earlier was implemented for this weapon-to-threat assignment domain. The control strategy for the inference network utilizes a best-first traversal of the knowledge base based upon the merit values of each node to determine the most influential and cost-effective node to process. In particular, it is especially important to realize that the "best first" algorithm is utilized in conjunction with the merit value calculations discussed earlier since it is these merits values which establish what is, in fact, "best".

The knowledge representation for this prototype system for weapon-to-threat assignment is a combination of:

(1) Frames: to represent declarative weapon, target/threat characteristics and capabilities. Each frame is a modular, decomposable "chunk" of knowledge organized into a fixed format. The slots within the frame are internal variables which are filled in by tokens to represent an instantiation of that frame; and (2) Inference Network: to store procedural knowledge and heuristics for weapon-to-threat assignment. The inference network consists of a collection of condition-action pairs (inference rules) representing weapon-to-target assignment knowledge. For example, following the format discussed earlier with regard to FIG. 3, the node in the inference network for computing the operational verification of deploying an AGM-78 is represented as:

| | |
|---|---|
| NODE LABEL: | Operational Verify AGM-78 |
| DATUM FUNCTION: | Operational Verification |
| CONTEXT: | AGM-78 |
| CODOMAIN: | 0 <= x <= 1 |
| DEFAULT: | .75 |
| ASSIGNMENT FUNCTION: | x = (min alt AGM-78) & (max alt AGM-78) & (max range AGM-78) |
| CONFIDENCE RATING: | .85 |
| VALUE: | Value = (.85) × (x) |
| MERIT: | (Determined from self-merit and link merits described earlier) |

The inference network control strategy was implemented to provide time-constrained responses for this weapon-to-threat assignment expert system. Appendix 5 contains a listing of the LISP implementation of this control structure which was run on a Harris H800 computer with a LISP 5.0 Interpreter. This inferencing strategy utilizes a best-first pruning algorithm, based upon time/influence constraints reflected in the calculated merit values, to generate and select the best weapon allocation plan. A weighted value is assigned to each node in the inference network, corresponding to that node's ability to alter the final conclusion. A time/impact value is assigned to each link of the connecting nodes to represent the processing cost associated with investigating that node. In time-constrained situations, the next node selected for investigation will correspond to the node with the greatest potential influence on the final conclusion and the least associated processing cost. Thus, this control mechanism insures that the solution strategy focuses on the most influential events in a cost-effective prioritized manner.

Initially, the user is prompted to initialize the global data base 14 by entering each weapon aboard the aircraft. As noted earlier, the possible weapons are listed in Appendix 1. The user is then prompted to simulate the operations of a target/threat recognition system by entering the potential target classifications and associated certainties. Appendix 2 contains a listing and description of each potential target in the knowledge base 10 of the prototype system. The user then enters the range of the given target/threat and the aircraft altitude to complete initialization of the global data base 12. A print mode may be enabled to allow the user to view the justification for the decision.

For the time-constrained inference strategy in this example, the user is prompted to enter the number of nodes to be evaluated. This time constraint corresponds to the number of nodes in the network that will be expanded for each proposition by the inference strategy. Generally, this number of nodes value will be replaced by a time-value which corresponds to the maximum response time in the given situation. However, as noted earlier, this "time" can either reflect real-time or processor time, depending on what is most important to the user.

In order to evaluate the performance of this time-constrained expert system inference strategy, the inventors have also implemented a traditional expert system control strategy for the same weapon-to-threat assignment domain used for the prototype example. Appendix 6 contains a listing of the LISP implementation of this traditional control strategy also arranged for the Harris H800 computer. This control strategy utilizes an exhaustive backward-chained. depth-first traversal of the knowledge base, similar to the EMYCIN system.

The knowledge base for this traditional expert system is a set of production rules consisting of antecedent-consequent pairs, representing weapon-to-threat assignment knowledge. Additionally, each production rule contains an associated certainty factor to indicate the domain expert's level of confidence in the consequent of a particular rule, given the certainty of its antecedents. The traditional backward-chained control structure for this traditional expert system constructs a set of hypotheses, with each hypothesis representing the potential assignment of one weapon from the weapon stores aboard the aircraft. The control strategy then attempts to verify all the antecedents of each hypothesis, in turn, until all hypotheses have been evaluated.

The traditional system searches the knowledge base for all the rules whose consequent matches the desired hypothesis. The control strategy recursively attempts to verify each antecedent of the resulting rules in turn until the antecedent part of a rule matches the initial problem description stored in the global data base. When all hypotheses have been exhausted, the system ranks the hypotheses by the degree to which they are supported by the evidence and the highest ranking hypothesis is presented to the user.

A comparison between the time-constrained inference strategy and traditional expert system inference strategy was made to evaluate the applicability of this real-time inference strategy for time-constrained avionic domains. Evaluation of the performance of the system indicates that this best-first strategy for selecting the most influential node in the network is far superior to traditional depth-first expert system search strategies, since traversal is not constrained to a particular order. It more closely resembles the way a human expert solves a time-constrained problem, by considering the most influential cost-effective factors first. Alternatives which don't appear promising are disregarded. Refinements to this inference strategy will make it generally applicable to a wide variety of military problems.

A logical question may be raised regarding the inference strategy of the present invention due to the degree of jumping around in the inference network resulting from the best-first strategy. A traditional depth-first strategy remains within a single sub-tree for the length of time and will never return to that subtree again. On the other hand, the best-first strategy of the present invention jumps all around the inference network in a seemingly bewildering fashion. However, since this system is designed to operate in real-time and the input data is received from sensors rather than from questioning the user, this jumping around is transparent to the user. More generally, this merit strategy may even be utilized within a depth first traversal of an inference network to order the antecedents of a node before it is expanded by the depth-first traversal.

The following is a sample scenario to demonstrate the reasoning process of the expert system. Appendix 7 contains a detailed listing of the reasoning process utilized in the traditional expert system control strategy. Appendix 8 contains a detailed listing of the reasoning process for time-constrained inference strategy when the number of nodes to expand was entered as five. The "trace" function of the LISP language was used to obtain a listing of each rule being tested in turn. The scenario includes:
WEAPON STORES: AGM-88
WASP
ERAM
MK-84H
TARGETS: TANK FORMATION (certainty=0.8)
SAM SITE SA-4 (certainty=0.2)
TARGET RANGE: 6000 meters
A/C ALTITUDE: 550 feet The human "expert" answer to this scenario would assign the ERAM to the given target location since it is deduced with high probability that the target is a tank formation. The AGM-88 is excluded since it is only effective against radiating targets (SAM, radar sites, communications, etc.) and thus ineffective against a non-radiating tank. The MK-84H is effective against primarily hard structures such as bridges and buildings and thus inappropriate. Both the ERAM and the WASP are highly effective against multiple armoured targets, however the target range is close to the maximum range limit of the WASP and thus potentially uncertain. On the other hand, the maximum range of the ERAM is significantly greater than the existing range to the target and thus more certain. Additionally, the ERAM is slightly more effective at low-level delivery than is the WASP.

Indeed, both the traditional and time-constrained expert system control strategies indicate the ERAM as being the first assignment choice and the WASP as being the second choice.

However, the number of antecedent-consequent clauses being verified to achieve this solution was 80 in the traditional expert system strategy and only 34 in the time-constrained strategy. It is apparent that this time-constrained inference strategy provides a feasible solution to the time-constrained expert system reasoning problem. More complex and detailed knowledge bases will require that even more antecedent-consequent relationships will be evaluated. Therefore, it can be seen that in time-constrained situations, the knowledge base can not be effectively traversed by traditional backward-chained depth-first traversal.

Although the present invention has been described with regard to a particular example, it is to be understood that the invention is not limited to this example. For example, although the present invention is especially useful in military applications such as that described in the example, it is not limited to military applications. On the contrary, the present invention can be used in any application where time constraints are an important consideration, for example, as a scheduling algorithm for multiprocessing expert systems. Similarly, although the LISP implementation given in Appendix 5 is well suited to the requirements of the invention, other program languages can be used. Further, even though the invention is particularly useful for time-constraint situations, with the "processing cost" being a reflection of time, it is to be understood that the "time" can be real-time or processor time or some combination of the two, depending upon what actual constraints face the user. As discussed earlier, military users will often face real-time constraints. On the other hand, in time-sharing environments, a user might find processor time to be more of a concern for cost or processor time allocation reasons. Or, as shown in the prototype, a simple node number limitation could be used as a "time-constraint" even though the actual real-time or processor time for this would not be known beforehand. Further, as mentioned previously, processing cost could actually be defined with regard to consumed resources (e.g. memory required etc.) of the computer system other than time, if these were of particular importance to the user. This would have to be reflected in the merit value calculation by assigning relative merits to each node based upon the effect which expanding the node during processing would have on the top node and the amount of the resource in question which would be consumed by thus expanding the node.

Accordingly, although a preferred embodiment of the invention has been shown and described, it will be apparent to those skilled in the art that changes may be made without departing from the principles and spirit of the invention, the scope of which is defined by the following claims.

Appendix 1

WEAPON STORES FOR PROTOTYPE EXPERT SYSTEM

| | |
|---|---|
| AGM-65D | : Infra-Red MAVERICK Air-to-Surface Tactical Missile |
| AGM-78 | : Standard Anti-Radiation Missle (ARM) |
| AGM-88 | : 700 lb High Speed Anti-Radiation Missle (HARM) |
| ERAM | : Extended Range Anti-Armour Mine ; 1000lb Cluster Bomb |
| WASP | : Wide Area Anti-Armour Munitions 2500lb Mini-Missle |
| MK-84L | : Low Drag GBU-15 Electro-Optical Guided 2000lb Stick Bomb |
| MK-84H | : Hi-Drag GBU-15 Electro-Optical Guided 2000lb Stick Bomb |
| CBU-90 | : 1000lb Cluster Bomb |

Appendix 2

POTENTIAL TARGETS/THREATS FOR PROTOTYPE EXPERT SYSTEM

| | |
|---|---|
| SA-4 | 70 km range, medium-to-high altitude SAM |
| SA-6 | 30 km range, low-to-medium altitude SAM |
| SA-13 | 8 km range, low altitude SAM |
| T-54 TANK | 50 km/hr with 100-mm TANK GUN (1400 mps) |
| T-80 TANK | 60 km/hr with 125-mm SMOOTHBORE (1750 mps) |
| EW/GCI RADAR VAN | Electronic Warfare / Communications Van |
| AIR DEFENSE CENTER | Air Defense Communications Center |
| GROUND JAMMER | Ground Based Jammer |
| A/C SHELTER | Covered Aircraft Storage Shelter |
| POL STORAGE TANK | Petroleum/Oil/Lubricant Storage Tank |
| AIRCRAFT OPEN | Uncovered Aircraft |
| ZIL-157 SUPPLY TRUCK | |
| TROOP CONCENTRATION | |
| RUNWAY | |
| HIGHWAY BRIDGE | |
| RAILWAY BRIDGE | |

Appendix 3

WEAPON-TO-THREAT EFFECTIVENESS MATRIX

| | AGM-65D | ERAM | WASP | MK-84H | MK-84L | CBU-90 | AGM-78 | AGM-88 |
|---|---|---|---|---|---|---|---|---|
| Mobile SAM's | X | X | X | – | – | X | X | X |
| Tank | X | X | X | – | – | X | – | – |
| Tank Formation | X | X | X | – | – | X | – | – |
| BTR-152 APC | X | X | X | – | – | X | – | – |
| EW/GCI Radar Van | X | X | X | – | – | X | X | X |
| Air Defense Ctr. | X | – | – | – | – | – | X | X |
| Runway | – | – | – | X | X | – | – | – |
| A/C Shelter | X | – | – | – | – | X | – | – |
| POL Storage | X | X | – | – | – | X | – | – |
| Ground Jammer | X | – | – | – | – | – | X | X |
| Aircraft Open | X | X | – | – | – | X | – | – |
| ZIL-157 Truck | X | X | – | – | – | X | – | – |
| Troop | – | X | – | – | – | X | – | – |
| Highway Bridge | X | – | – | X | X | – | – | – |
| Railway Bridge | X | – | – | X | X | – | – | – |

– 49 –

Appendix 4

LIST OF RULES FOR WEAPON-TO-THREAT ASSIGNMENT KNOWLEDGE BASE

```
(setq rules '( (rule verify1      (if     (maximum range AGM-78)
                           (minimum altitude AGM-78)
                           (maximum altitude AGM-78))
                   (then)  (verified AGM-78 (1.0))))

(rule verify2      (if     (maximum range AGM-88)
                           (minimum altitude AGM-88)
                           (maximum altitude AGM-88))
                   (then)  (verified AGM-88 (1.0))))

(rule verify3      (if     (maximum range MK-84L)
                           (minimum range MK-84L)
                           (minimum altitude MK-84L))
                   (then)  (verified MK-84L (1.0))))

(rule verify4      (if     (maximum range MK-84H)
                           (minimum range MK-84H)
                           (minimum altitude MK-84H))
                   (then)  (verified MK-84H (1.0))))

(rule verify5      (if     (maximum range WASP)
                           (minimum altitude WASP)
                           (maximum altitude WASP))
                   (then)  (verified WASP (1.0))))

(rule verify6      (if     (maximum range ERAM)
                           (minimum range ERAM)
                           (minimum altitude ERAM))
                   (then)  (verified ERAM (1.0))))

(rule verify7      (if     (maximum range AGM-65D)
                           (minimum range AGM-65D)
                           (minimum altitude AGM-65D)
                           (maximum altitude AGM-65D))
                   (then)  (verified AGM-65D (1.0))))

(rule verify8      (if     (maximum range CBU-90)
                           (minimum range CBU-90)
                           (minimum altitude CBU-90))
                   (then)  (verified CBU-90 (1.0))))

(rule verify9      (if     (maximum range GUNS)
                           (minimum range GUNS))
                   (then)  (verified GUNS (1.0))))

(rule maxrng1      (if     (range < 10000))
                   (then)  (maximum range AGM-78 (1.0))))

(rule maxrng2      (if     (range < 18500))
```

- 50 -

```
                    (then    (maximum range AGM-88 (1.0))))
(rule maxrng3       (if      (range < 7000))
                    (then    (maximum range WASP (1.0))))
(rule maxrng4       (if      (range < 24000))
                    (then    (maximum range AGM-65D (1.0))))
(rule maxrng5       (if      (range < 4000))
                    (then    (maximum range GUNS (1.0))))
(rule maxrng6       (if      (range < 12000))
                    (then    (maximum range CBU-90 (1.0))))
(rule maxrng7       (if      (range < 10000))
                    (then    (maximum range ERAM (1.0))))
(rule maxrng8       (if      (range < 30000))
                    (then    (maximum range MK-84L (1.0))))
(rule maxrng9       (if      (range < 12000))
                    (then    (maximum range MK-84H (1.0))))
(rule minrng1       (if      (range > 750))
                    (then    (minimum range MK-84L (1.0))))
(rule minrng2       (if      (range > 550))
                    (then    (minimum range MK-84H (1.0))))
(rule minrng3       (if      (range > 400))
                    (then    (minimum range ERAM (1.0))))
(rule minrng4       (if      (range > 700))
                    (then    (minimum range AGM-65D (1.0))))
(rule minrng5       (if      (range > 500))
                    (then    (minimum range CBU-90 (1.0))))
(rule minrng6       (if      (range > 200))
                    (then    (minimum range GUNS (1.0))))
(rule minalt1       (if      (altitude > 200))
                    (then    (minimum altitude AGM-78 (1.0))))
(rule minalt2       (if      (altitude > 500))
                    (then    (minimum altitude MK-84H (1.0))))
(rule minalt3       (if      (altitude > 500))
                    (then    (minimum altitude MK-84L (1.0))))
(rule minalt4       (if      (altitude > 200))
                    (then    (minimum altitude WASP (1.0))))
(rule minalt5       (if      (altitude > 150))
```

- 51 -

```
                    (then      (minimum altitude ERAM (1.0))))
(rule minalt6       (if        (altitude > 300))
                    (then      (minimum altitude AGM-65D (1.0))))

(rule minalt7       (if        (altitude > 200))
                    (then      (minimum altitude CBU-90 (1.0))))

(rule minalt8       (if        (altitude > 200))
                    (then      (minimum altitude AGM-88 (1.0))))

(rule maxalt1       (if        (altitude < 33000))
                    (then      (maximum altitude AGM-78 (1.0))))

(rule maxalt2       (if        (altitude < 33000))
                    (then      (maximum altitude WASP (1.0))))

(rule maxalt3       (if        (altitude < 33000))
                    (then      (maximum altitude AGM-65D (1.0))))

(rule maxalt4       (if        (altitude < 33000))
                    (then      (maximum altitude AGM-88 (1.0))))

(rule target1       (if        (OR    (target is SA-4)
                                      (target is SA-6)
                                      (target is SA-13)))
                    (then      (target is SAM (1.0))))

(rule target2       (if        (OR    (target is T-54)
                                      (target is T-88)
                                      (target is tank formation)))
                    (then      (target is tank (1.0))))

(rule target3       (if        (or    (target is highway bridge)
                                      (target is railroad bridge)))
                    (then      (target is bridge (1.0))))

(rule classify1     (if        (or    (target is SAM)
                                      (target is EW/GCI radar van)
                                      (target is air defence center)
                                      (target is ground jammer)))
                    (then      (target radiates (.95))))

(rule classify2     (if        (or    (target is building)
                                      (target is bridge)
                                      (target is runway)))
                    (then      (target is hard structure (.95))))

(rule classify3     (if        (or    (target is tank)
                                      (target is APC)
                                      (target is SAM)))
                    (then      (target is armoured (.95))))
```

```
(rule classify4    (if      (or     (target is aircraft shelter)
                                    (target is POL storage)
                                    (target is aircraft open)
                                    (target is supply truck)))
                   (then    (target is unarmoured soft (.95))))

(rule consider1    (if      (target radiates)
                            (verified agm-88))
                   (then    (consider agm-88 (.9))))

(rule consider2    (if      (target radiates)
                            (verified agm-78))
                   (then    (consider agm-78 (.9))))

(rule consider3    (if      (target is armoured)
                            (verified ERAM))
                   (then    (consider ERAM (.9))))

(rule consider4    (if      (target is armoured)
                            (verified WASP))
                   (then    (consider WASP (.9))))

(rule consider5    (if      (target is armoured)
                            (verified CBU-90))
                   (then    (consider CBU-90 (.9))))

(rule consider6    (if      (target is hard structure)
                            (verified MK-84H))
                   (then    (consider MK-84H (.9))))

(rule consider7    (if      (target is hard structure)
                            (verified MK-84L))
                   (then    (consider MK-84L (.9))))

(rule consider8    (if      (OR     (target is armoured)
                                    (target is unarmoured soft)
                                    (target is bridge)
                                    (target radiates))
                            (verified agm-65D))
                   (then (consider agm-65d (.9))))

(rule consider9    (if      (target is unarmoured soft)
                            (verified AGM-65D))
                   (then    (consider agm-65D (.9))))

(rule consider10   (if      (target is unarmoured soft)
                            (verified ERAM))
                   (then    (consider ERAM (.9))))

(rule consider11   (if      (target is unarmoured soft)
                            (verified CBU-90))
                   (then    (consider CBU-90 (.9))))

(rule consider12   (if      (target is troop concentration)
```

```
                              (verified ERAM))
                  (then       (consider ERAM (.9))))

(rule consider13  (if         (target is troop concentration)
                              (verified CBU-90))
                  (then       (consider CBU-90 (.9))))

(rule tgt1        (if         (OR    (target is SA-6)
                                     (target is SA-13)))
                  (then       (high sensitivity required (.8))))

(rule tgt2        (if         (OR    (target is SA-6)
                                     (target is SA-13)))
                  (then       (fast reaction time required (.8))))

(rule tgt3        (if         (target is tank formation))
                  (then       (multiple targets (.98))))

(rule tgt4        (if         (range < 1000))
                  (then       (standoff delivery (.98))))

(rule tgt5        (if         (altitude < 600))
                  (then       (low-level delivery (.98))))

(rule assign1     (if         (consider agm-88)
                              (OR    (high sensitivity required)
                                     (fast reaction time required)))
                  (then       (assign agm-88 (.9))))

(rule assign2     (if         (consider agm-88))
                  (then       (assign agm-88 (.7))))

(rule assign3     (if         (consider agm-78))
                  (then       (assign agm-78 (.7))))

(rule assign4     (if         (consider ERAM)
                              (or    (multiple targets)
                                     (low-level delivery)))
                  (then       (assign ERAM (.9))))

(rule assign5     (if         (consider ERAM))
                  (then       (assign ERAM (.7))))

(rule assign6     (if         (consider WASP)
                              (OR    (multiple targets)
                                     (standoff delivery)))
                  (then       (assign WASP (.9))))

(rule assign7     (if         (consider WASP))
                  (then       (assign WASP (.7))))

(rule assign8     (if         (consider AGM-65D))
                  (then       (assign AGM-65D (1.0))))
```

- 54 -

```
(rule assign9      (if    (consider cbu-90)
                          (TOSS launch))
                   (then  (assign cbu-90 (1.0))))

(rule assign10     (if    (consider mk-84H))
                   (then  (assign mk-84H (1.0))))

(rule assign11     (if    (consider mk-84L))
                   (then  (assign mk-84L (1.0)))) ))
```

Appendix 5

LISP IMPLEMENTATION OF TIME-CONSTRAINED EXPERT SYSTEM

```
(DEFUN INFLUENTIAL-FACTS (FACT)
    (PROG (COUNT FACTS-TO-VERIFY)
        (SETQ COUNT CNT)
        (SETQ FACT-LIST NIL)
        (SETQ FACTS-TO-VERIFY NIL)
        (SETQ VER-FACT FACT)
    LOOP
        (COND ((EQUAL COUNT 0.) (RETURN FACTS-TO-VERIFY))
            (T
            (SETQ FACT-LIST (APPEND (EXPAND VER-FACT)
                                    FACT-LIST))
            (SETQ VER-FACT (PRIORITIZE FACT-LIST))
            (SETQ FACT-LIST (REMOVE VER-FACT FACT-LIST))
            (SETQ FACTS-TO-VERIFY (CONS VER-FACT FACTS-TO-VERIFY))
            (COND ((NULL FACT-LIST)
                    (RETURN FACTS-TO-VERIFY)))
            (SETQ COUNT (- COUNT 1.))
            (GO LOOP)))))

(DEFUN EXPAND (FACT)
    (PROG (RULE-LIST IFS RESULT)
        (SETQ RULE-LIST (INTHEN FACT RULES))
    LOOP1
        (COND ((NULL RULE-LIST) (GO LOOP2))
            (T
            (SETQ IFS (APPEND (CDADDR (CAR RULE-LIST))
                              IFS))
            (SETQ RULE-LIST (CDR RULE-LIST))
            (GO LOOP1)))
    LOOP2
        (COND ((NULL IFS)
                (RETURN RESULT))
            ((NOT (MEMBER (CAR IFS)
                          RESULT))
            (SETQ RESULT (CONS (CAR IFS)
                               RESULT))))
        (SETQ IFS (CDR IFS))
        (GO LOOP2)))

(DEFUN PRIORITIZE (FACT-LIST)
    (PROG (LST LRGST FCT)
        (SETQ LST FACT-LIST)
        (SETQ LRGST 0.)
    LOOP
        (COND ((NULL LST)
                (RETURN (CDR FCT)))
```

```
                ((> (CAAAR LST)
                    LRGST)
                 (SETQ LRGST (CAAAR LST))
                 (SETQ PCT (CAR LST))))
            (SETQ LST (CDR LST))
            (GO LOOP)))

(DEFUN REMOVE (FACT LIST)
    (PROG (LST RESULT)
        (SETQ LST LIST)
    LOOP
        (COND ((NULL LST) (RETURN RESULT))
              ((EQUAL FACT
                      (CDAR LST))
               NIL)
              (T
               (SETQ RESULT (CONS (CAR LST)
                                  RESULT))))
        (SETQ LST (CDR LST))
        (GO LOOP)))

(DEFUN REMOVE-PRIORITY-RULES NIL
    (PROG (RULE-LIST IFS LABEL THENS RIFS RULE R-RULES)
        (SETQ RULE-LIST RULES)
    LOOP
        (COND ((NULL RULE-LIST) (RETURN R-RULES))
              (T
               (SETQ LABEL (CADR (CAR RULE-LIST)))
               (SETQ IFS (CDADDR (CAR RULE-LIST)))
               (SETQ THENS (CADDDR (CAR RULE-LIST)))
               (SETQ RIFS (REMOVE-PRIORITY-IFS IFS))
               (SETQ RULE (LIST 'RULE
                                LABEL
                                RIFS
                                THENS))
               (SETQ R-RULES (CONS RULE R-RULES))
               (SETQ RULE-LIST (CDR RULE-LIST))
               (GO LOOP)))))

(DEFUN REMOVE-PRIORITY-IFS (IF-LIST)
    (PROG (IFS RIFS)
        (SETQ IFS IF-LIST)
    LOOP
        (COND ((NULL IFS)
               (SETQ RIFS (CONS 'IF RIFS))
               (RETURN RIFS))
```

```
            (T
             (SETQ RIFS (CONS (CDAR IFS)
                              RIFS))
             (SETQ IFS (CDR IFS))
             (GO LOOP)))))

(DEFUN ASSIGNMENT (HYPOTH)
    (PROG (POSSIBILITIES CNT)
          (SETQ POSSIBILITIES HYPOTH)
          (PRINT '(ENTER TIME CONSTRAINT :))
          (SETQ V-FACTS HYPOTHESES)
          (SETQ CNT (READ))
     LOOP
          (COND ((NULL POSSIBILITIES) (GO LOOP2))
                (T
                 (SETQ V-FACTS (APPEND (INFLUENTIAL-FACTS (CAR
                                                          POSSIBILITIES
                                                          ))
                                       V-FACTS))
                 (SETQ POSSIBILITIES (CDR POSSIBILITIES))
                 (GO LOOP)))
     LOOP2
          (SETQ RULES (REMOVE-PRIORITY-RULES))
          (VERIFY-ALL-HYPOTHESES HYPOTH)
          (RETURN (RESULTS FACTS))))

(DEFUN VERIFY-ALL-HYPOTHESES (HYPOTHS)
    (PROG (POSS)
          (SETQ POSS HYPOTHS)
     LOOP
          (COND ((NULL POSS) (GO LOOP2))
                (T
                 (VERIFY (CAR POSS))
                 (SETQ POSS (CDR POSS))
                 (GO LOOP)))
     LOOP2
          (RETURN T)))

(DEFUN VERIFY (FACT)
    (PROG (CERT-VAL WPN-RANGE WPN-ALT RULES-TO-TEST)
          (SETQ CERT-VAL (RECALL FACT FACTS))
          (COND ((> CERT-VAL 0.) (RETURN CERT-VAL))
                ((MEMBER FACT UNDEDUCED) (RETURN 0.))
                ((EQUAL (CAR FACT)
                        'RANGE)
                 (SETQ WPN-RANGE (CADDR FACT))
                 (COND ((EQUAL (CADR FACT)
```

```
                                    '<)
                        (RETURN (COMPUTE-MAX-RANGE-CERT WPN-RANGE
                                    TGT-RANGE)))
                    ((EQUAL (CADR FACT)
                            '>)
                        (RETURN (COMPUTE-MIN-RANGE-CERT WPN-RANGE
                                    TGT-RANGE)))))
            ((EQUAL (CAR FACT)
                    'ALTITUDE)
                (SETQ WPN-ALT (CADDR FACT))
                (COND ((EQUAL (CADR FACT)
                            '<)
                        (RETURN (COMPUTE-MAX-ALT-CERT WPN-ALT AC-ALT)))
                    ((EQUAL (CADR FACT)
                            '>)
                        (RETURN (COMPUTE-MIN-ALT-CERT WPN-ALT AC-ALT)))))
            ))
        (COND ((MEMBER FACT V-FACTS)
                (SETQ CERT-VAL (TRY-ALL-RULES FACT)))
            (T
                (SETQ CERT-VAL (DEFAULT FACT))))
        (RETURN CERT-VAL)))

(DEFUN TRY-ALL-RULES (FACT)
    (PROG (RULES-TO-TEST CERT)
        (SETQ CERT 0.)
        (SETQ RULES-TO-TEST (INTHEN FACT RULES))
        (COND ((NULL RULES-TO-TEST)
                (COND ((MEMBER FACT ASKED)
                        (RETURN 0.))
                    ((AND (P (LIST 'IS
                                    'THIS
                                    'TRUE:
                                    FACT))
                            (READ))
                        (P (LIST 'ENTER 'CERTAINTY))
                        (SETQ CERT-VAL (READ))
                        (REMEMBER (APPEND FACT
                                        (LIST (LIST CERT-VAL))))
                        (TERPRI)
                        (RETURN CERT-VAL))
                    (T
                        (SETQ ASKED (CONS FACT ASKED))
                        (SETQ UNDEDUCED (CONS FACT UNDEDUCED))
                        (RETURN 0.)))))
        LOOP
        (COND ((NULL RULES-TO-TEST)
                (RETURN CERT))
            (T
                (SETQ CERT (GREATER CERT
                                (TRYRULE (CAR RULES-TO-TEST))))

- 59 -
```

```
                    (SETQ RULES-TO-TEST (CDR RULES-TO-TEST))
                    (GO LOOP)))))

(DEFUN TRYRULE (RULE)
    (PROG (CERTAIN)
        (SETQ CERTAIN (TESTIFS RULE))
        (COND ((> CERTAIN 0.)
               (USETHEN RULE
                        (* CERTAIN
                           (RULE-CERT RULE)))
               (RETURN (* CERTAIN
                          (RULE-CERT RULE))))
              (T
               (RETURN 0.)))))

(DEFUN TESTIFS (RULE)
    (PROG (IFS CERTAIN RESULT)
        (SETQ IFS (CDADDR RULE))
        (COND ((UNDEDUCE IFS) (RETURN 0.)))
        (SETQ RESULT 1.)
LOOP
        (COND ((NULL (CAR IFS))
               (RETURN RESULT)))
        (SETQ CERTAIN (VERIFY (CAR IFS)))
        (COND ((> CERTAIN 0.)
               (SETQ RESULT (* RESULT CERTAIN))
               (SETQ IFS (CDR IFS))
               (GO LOOP))
              (T
               (RETURN 0.)))))

(DEFUN INTHEN (FACT RULES)
    (COND ((NULL RULES) NIL)
          ((THENP FACT
                  (CAR RULES))
           (CONS (CAR RULES)
                 (INTHEN FACT
                         (CDR RULES))))
          (T
           (INTHEN FACT
                   (CDR RULES)))))

(DEFUN THENP (FACT RULE)

- 60 -
```

```
(PROG (RL)
      (SETQ RL (CDR (CADDDR RULE)))
 LOOP
      (COND ((NULL RL) (RETURN NIL))
            ((MATCH FACT
                    (CAR RL))
             (RETURN T))
            (T
             (SETQ RL (CDR RL))
             (GO LOOP))))))

(DEFUN USETHEN (RULE CERT-VALUE)
   (PROG (THENS VAL)
         (SETQ THENS (CDR (CADDDR RULE)))
    LOOP
         (COND ((NULL (CAR THENS))
                (RETURN CERT-VALUE))
               ((REMEMBER(SETQ VAL (REPLACE-CERTAINTY (CAR THENS)
                                                     CERT-VALUE)))
                (COND (PRTFLG
                       (P (LIST 'RULE
                                (CADR RULE)
                                'DEDUCES
                                VAL))
                       (TERPRI)))))
         (SETQ THENS (CDR THENS))
         (GO LOOP)))

(DEFUN RECALL (FACT FCTS)
   (COND ((NULL FCTS) 0.)
         ((MATCH FACT
                 (CAR FCTS))
          (CAR (LAST-ELEMENT (CAR FCTS))))
         (T
          (RECALL FACT
                  (CDR FCTS)))))

(DEFUN REMEMBER (NEW)
   (COND ((MEMBER NEW FACTS) NIL)
         (T
          (SETQ FACTS (CONS NEW FACTS))
          NEW)))
```

- 61 -

```
(DEFUN REPLACE-CERTAINTY (CLAUSE VALUE)
    (PROG (TEMPRULE)
      LOOP
         (COND ((NULL (CDR CLAUSE))
                 (RETURN (REVERSE (CONS (LIST VALUE)
                                          TEMPRULE))))
               (T
                 (SETQ TEMPRULE (CONS (CAR CLAUSE)
                                        TEMPRULE))
                 (SETQ CLAUSE (CDR CLAUSE))
                 (GO LOOP)))))

(DEFUN RULE-CERT (RULE)
    (CAR (LAST-ELEMENT (CADR (CADDDR RULE)))))
```

```
(DEFUN ASSIGN NIL
    (PROG (TGT TGT-CERT FACTS UNDEDUCED TGT-RANGE AC-ALT POSSIBLE-TGTS
        TEMP HYPOTHESES WEAPON-STORES PRTFLG)
        (TERPRI)
        (SETQ TOTAL 0.)
        (INITIALIZE-POSSIBLE-TARGETS)
        (PRINT '(ENTER PRINT MODE :))
        (SETQ PRTFLG (READ))
        (SETQ WEAPON-STORES (INITIALIZE-WEAPON-STORES))
        (SETQ HYPOTHESES (INITIALIZE-HYPOTHESES WEAPON-STORES))
        (SETQ FACTS (INITIALIZE-TARGET-LIST))
        (SETQ UNDEDUCED (INITIALIZE-UNDEDUCED-TGTS))
        (SETQ TGT-RANGE (TARGET-RANGE))
        (SETQ AC-ALT (AIRCRAFT-ALTITUDE))
        (SETQ RESULT-LIST (ASSIGNMENT HYPOTHESES))
        (BEST-RESULT RESULT-LIST)))

(DEFUN TARGET-RANGE NIL
    (PROG (RNG)
        (PRINT '(ENTER TARGET RANGE IN METERS :))
        (SETQ RNG (READ))
        (RETURN RNG)))

(DEFUN AIRCRAFT-ALTITUDE NIL
    (PROG (ALT)
        (PRINT '(ENTER AIRCRAFT ALTITUDE IN FEET :))
        (SETQ ALT (READ))
        (TERPRI)
        (RETURN ALT)))

(DEFUN INITIALIZE-POSSIBLE-TARGETS NIL
    (SETQ POSSIBLE-TGTS '((TARGET IS SA-4) (TARGET IS SA-6) (TARGET IS
                SA-13) (TARGET IS T-54) (TARGET IS T-88) (
                TARGET IS TANK FORMATION) (TARGET IS APC) (
                TARGET IS EW/GCI RADAR VAN) (TARGET IS AIR
                DEFENCE CENTER) (TARGET IS GROUND JAMMER) (
                TARGET IS RUNWAY) (TARGET IS AIRCRAFT SHELTER)
                (TARGET IS POL STORAGE) (TARGET IS AIRCRAFT
                OPEN) (TARGET IS SUPPLY TRUCK) (TARGET IS
                TROOP CONCENTRATION) (TARGET IS HIGHWAY BRIDGE
                ) (TARGET IS RAILROAD BRIDGE) (TARGET IS
                BUILDING))))
```

- 63 -

```
(DEFUN INITIALIZE-WEAPON-STORES NIL
    (PROG (TEMP STORES)
    LOOP
        (PRINT '(WEAPON TYPE :))
        (SETQ TEMP (READ))
        (COND ((NULL TEMP) (RETURN STORES))
              ((INVALID-WPN-RESPONSE TEMP)
               (TV:BEEP)
               (PRINT '(INVALID WEAPON TYPE :))
               (PRINC TEMP)
               (TERPRI))
              (T
               (SETQ STORES (CONS TEMP STORES))))
        (GO LOOP)))

(DEFUN INITIALIZE-HYPOTHESES (WPN-STORES)
    (PROG (WPN-LIST HYPOTH)
        (SETQ WPN-LIST WPN-STORES)
    LOOP
        (COND ((NULL (CAR WPN-LIST))
               (RETURN HYPOTH))
              (T
               (SETQ HYPOTH (CONS (LIST 'ASSIGN
                                        (CAR WPN-LIST))
                                  HYPOTH))
               (SETQ WPN-LIST (CDR WPN-LIST))
               (GO LOOP)))))

(DEFUN INITIALIZE-TARGET-LIST NIL
    (PROG (TGT TGT-CERT FACTS)
    LOOP
        (PRINT '(TARGET CLASSIFICATION :))
        (SETQ TGT (ENTER-TGT))
        (COND ((EQUAL TGT NIL) (RETURN FACTS))
              (T
               (PRINT (APPEND '(ENTER CERTAINTY OF :) TGT))
               (SETQ TGT-CERT (READ))
               (COND ((> TGT-CERT 0.)
                      (SETQ FACTS (CONS (APPEND (APPEND (LIST 'TARGET
                                                              'IS)
                                                        TGT)
                                                (LIST (LIST TGT-CERT))
                                        )
                                        FACTS))))
               (GO LOOP)))))

(DEFUN INITIALIZE-UNDEDUCED-TGTS NIL
    (PROG (ALL-TARGETS)
```

- 64 -

```
            (SETQ ALL-TARGETS POSSIBLE-TGTS)
      LOOP
           (COND ((NULL (CAR ALL-TARGETS))
                   (RETURN UNDEDUCED))
                 ((MEMBER-LIST (CAR ALL-TARGETS)
                                FACTS)
                   (GO LOOP2))
                 (T
                   (SETQ UNDEDUCED (CONS (CAR ALL-TARGETS)
                                          UNDEDUCED))))
      LOOP2
           (SETQ ALL-TARGETS (CDR ALL-TARGETS))
           (GO LOOP)))

(DEFUN ENTER-TGT NIL
    (PROG (CLASS TEMP)
      LOOP
           (SETQ TEMP (READ))
           (COND ((EQUAL TEMP NIL) (RETURN NIL))
                 ((EQUAL TEMP '/)
                   (RETURN (REVERSE CLASS)))
                 (T
                   (SETQ CLASS (CONS TEMP CLASS))
                   (GO LOOP)))))

(DEFUN INVALID-WPN-RESPONSE (WPN)
    (COND ((MEMBER WPN '(AGM-65D ERAM WASP MK-84H MK-84L CBU-90 AGM-78
                          AGM-88 GUNS))
            NIL)
          (T T)))

(DEFUN MEMBER-LIST (FACT FACTS)
    (PROG (FCT-LIST)
          (SETQ FCT-LIST FACTS)
      LOOP
           (COND ((NULL (CAR FCT-LIST))
                   (RETURN NIL))
                 ((MATCH FACT
                          (CAR FCT-LIST))
                   (RETURN T))
                 (T
                   (SETQ FCT-LIST (CDR FCT-LIST))
                   (GO LOOP)))))

(DEFUN UNDEDUCE (IF-LST)

- 65 -
```

```
(PROG (LST)
      (SETQ LST IF-LST)
 LOOP
      (COND ((NULL LST) (RETURN NIL))
            ((MEMBER (CAR LST)
                     UNDEDUCED)
             (RETURN T))
            (T
             (SETQ LST (CDR LST))
             (GO LOOP)))))

(DEFUN LESSER (ARG1 ARG2)
   (COND ((< ARG1 ARG2) ARG1)
         (T ARG2)))

(DEFUN GREATER (ARG1 ARG2)
   (COND ((> ARG1 ARG2) ARG1)
         (T ARG2)))

(DEFUN MATCH (FACT CLAUSE)
   (COND ((NULL FACT) T)
         ((NULL CLAUSE) NIL)
         ((NOT (EQUAL (CAR FACT)
                      (CAR CLAUSE)))
          NIL)
         (T
          (MATCH (CDR FACT)
                 (CDR CLAUSE)))))

(DEFUN LAST-ELEMENT (LST)
   (COND ((NULL (CDR LST))
          (CAR LST))
         (T
          (LAST-ELEMENT (CDR LST)))))

(DEFUN COMPUTE-MAX-RANGE-CERT (WPN-RG TGT-RG)
   (PROG (TEMP)
      (SETQ TEMP (/ (- (+ WPN-RG
                          (* .1 WPN-RG))
                       TGT-RG)
```

- 66 -

```
                              (+ WPN-RG
                                 (* .1 WPN-RG))))
            (COND ((> TEMP 0.)
                   (RETURN (SQRT (SQRT TEMP))))
                  (T
                   (RETURN 0.)))))

(DEFUN COMPUTE-MIN-RANGE-CERT (WPN-RG TGT-RG)
    (PROG (TEMP)
          (RETURN 1.)))

(DEFUN COMPUTE-MAX-ALT-CERT (WPN-ALT AC-ALT)
    (PROG (TEMP)
          (RETURN 1.)))

(DEFUN COMPUTE-MIN-ALT-CERT (WPN-ALT AC-ALT)
    (PROG (TEMP)
          (RETURN 1.)))

(DEFUN RESULTS (FACT-LIST)
    (PROG (LST RESULT)
          (SETQ LST FACT-LIST)
     LOOP
          (COND ((NULL (CAR LST))
                 (RETURN RESULT))
                ((EQUAL (CAAR LST)
                        'ASSIGN)
                 (SETQ RESULT (CONS (CAR LST)
                                    RESULT))))
          (SETQ LST (CDR LST))
          (GO LOOP)))

(DEFUN BEST-RESULT (RSLTS)
    (PROG (LST MAX-WPN MAX-VAL)
          (SETQ LST RSLTS)
          (SETQ MAX-WPN NIL)
          (SETQ MAX-VAL 0.)
     LOOP
          (COND ((NULL LST)
```

- 67 -

```
        (TV:BEEP)
        (RETURN MAX-WPN))
      ((> (CAR (CADDAR LST))
          MAX-VAL)
        (SETQ MAX-WPN (CADAR LST))
        (SETQ MAX-VAL (CAR (CADDAR LST)))))
  (SETQ LST (CDR LST))
  (GO LOOP)))
```

```
(DEFUN DEFAULT (FACT)
    (COND ((EQUAL FACT '(MAXIMUM RANGE AGM-78))          .6)
          ((EQUAL FACT '(MINIMUM ALTITUDE AGM-78))       .9)
          ((EQUAL FACT '(MAXIMUM ALTITUDE AGM-78))       .9)
          ((EQUAL FACT '(MAXIMUM RANGE AGM-88))          .8)
          ((EQUAL FACT '(MAXIMUM ALTITUDE AGM-88))       .9)
          ((EQUAL FACT '(MINIMUM ALTITUDE AGM-88))       .9)
          ((EQUAL FACT '(MAXIMUM RANGE MK-84H))          .75)
          ((EQUAL FACT '(MAXIMUM RANGE ERAM))            .7)
          ((EQUAL FACT '(MAXIMUM RANGE WASP))            .4)
          ((EQUAL FACT '(MINIMUM RANGE MK-84H))          .8)
          ((EQUAL FACT '(MINIMUM ALTITUDE MK-84H))       .8)
          ((EQUAL FACT '(MINIMUM RANGE WASP))            .8)
          ((EQUAL FACT '(MAXIMUM ALTITUDE WASP))         .9)
          ((EQUAL FACT '(MINIMUM RANGE ERAM))            .9)
          ((EQUAL FACT '(MINIMUM ALTITUDE ERAM))         .9)
          ((EQUAL FACT '(TARGET IS T-54))                .8)
          ((EQUAL FACT '(TARGET IS T-88))                .85)
          ((EQUAL FACT '(TARGET IS TANK FORMATION))      .85)
          ((EQUAL FACT '(TARGET IS HIGHWAY BRIDGE))      .4)
          ((EQUAL FACT '(TARGET IS RAILROAD BRIDGE))     .4)
          ((EQUAL FACT '(TARGET IS BUILDING))            .3)
          ((EQUAL FACT '(TARGET IS BRIDGE))              .4)
          ((EQUAL FACT '(TARGET IS TANK))                .86)
          ((EQUAL FACT '(TARGET IS ARMOURED))            .9)
          ((EQUAL FACT '(TARGET IS HARD STRUCTURE))      .4)
          ((EQUAL FACT '(TARGET IS UNARMOURED SOFT))     .4)
          ((EQUAL FACT '(TARGET IS TROOPS))              .4)
          ((EQUAL FACT '(MULTIPLE TARGETS))              .7)
          ((EQUAL FACT '(STANDOFF DELIVERY))             .6)
          ((EQUAL FACT '(CONSIDER ERAM))                 .7)
          ((EQUAL FACT '(CONSIDER WASP))                 .7)
          ((EQUAL FACT '(CONSIDER MK-84H))               .5)
          ((EQUAL FACT '(VERIFIED ERAM))                 .8)
          ((EQUAL FACT '(VERIFIED WASP))                 .6)
          ((EQUAL FACT '(VERIFIED MK-84H))               .7)
          ((EQUAL FACT '(TARGET IS SA-6))                .7)
          ((EQUAL FACT '(TARGET IS SA-4))                .6)
          ((EQUAL FACT '(TARGET IS SA-13))               .7)
          ((EQUAL FACT '(TARGET IS SAM))                 .7)
          ((EQUAL FACT '(TARGET RADIATES))               .7)
          ((EQUAL FACT '(CONSIDER AGM-88))               .7)
          ((EQUAL FACT '(CONSIDER AGM-78))               .6)
          ((EQUAL FACT '(HIGH SENSITIVITY REQUIRED))     .8)
          ((EQUAL FACT '(VERIFIED AGM-78))               .5)
          ((EQUAL FACT '(VERIFIED AGM-88))               .85)
          (T                                             .6)))
```

- 69 -

Appendix 6

LISP OF TRADITIONAL EXPERT SYSTEM

```
(DEFUN ASSIGNMENT NIL
    (PROG (POSSIBILITIES ASKED)
          (SETQ POSSIBILITIES HYPOTHESES)
     LOOP
          (COND ((NULL POSSIBILITIES)
                 (RETURN (RESULTS FACTS))))
          (VERIFY (CAR POSSIBILITIES))
          (SETQ POSSIBILITIES (CDR POSSIBILITIES))
          (GO LOOP)))

(DEFUN VERIFY (FACT)
    (PROG (RULES-TO-TEST CERT-VAL WPN-RANGE WPN-ALT)
          (SETQ CERT-VAL (RECALL FACT FACTS))
          (COND ((> CERT-VAL 0.) (RETURN CERT-VAL))
                ((MEMBER FACT UNDEDUCED) (RETURN 0.)))
          (SETQ TOTAL (+ 1. TOTAL))
          (COND ((EQUAL (CAR FACT)
                        'OR)
                 (RETURN (ORED (CDR FACT))))
                ((EQUAL (CAR FACT)
                        'EQUIVALENT)
                 (RETURN (COMPARE-FACTS FACT)))
                ((EQUAL (CAR FACT)
                        'RANGE)
                 (SETQ WPN-RANGE (CADDR FACT))
                 (COND ((EQUAL (CADR FACT)
                               '<)
                        (RETURN (COMPUTE-MAX-RANGE-CERT WPN-RANGE
                                    TGT-RANGE)))
                       ((EQUAL (CADR FACT)
                               '>)
                        (RETURN (COMPUTE-MIN-RANGE-CERT WPN-RANGE
                                    TGT-RANGE)))))
                ((EQUAL (CAR FACT)
                        'ALTITUDE)
                 (SETQ WPN-ALT (CADDR FACT))
                 (COND ((EQUAL (CADR FACT)
                               '<)
                        (RETURN (COMPUTE-MAX-ALT-CERT WPN-ALT AC-ALT)))
                       ((EQUAL (CADR FACT)
                               '>)
                        (RETURN (COMPUTE-MIN-ALT-CERT WPN-ALT AC-ALT))))))
          (SETQ RULES-TO-TEST (INTHEN FACT RULES))
          (COND ((NULL RULES-TO-TEST)
                 (COND ((MEMBER FACT ASKED)
                        (RETURN 0.))
                       ((AND (P (LIST 'IS
                                       'THIS
                                       'TRUE:
```

- 70 -

```
                                    FACT))
                            (READ))
                    (P (LIST 'ENTER 'CERTAINTY))
                    (SETQ CERT-VAL (READ))
                    (REMEMBER (APPEND FACT
                                        (LIST (LIST CERT-VAL))))
                    (TERPRI)
                    (RETURN CERT-VAL))
                   (T
                    (SETQ ASKED (CONS FACT ASKED))
                    (SETQ UNDEDUCED (CONS FACT UNDEDUCED))
                    (RETURN 0.)))))
        LOOP
             (COND ((NULL RULES-TO-TEST)
                    (RETURN CERT-VAL)))
             (SETQ CERT-VAL (GREATER CERT-VAL
                                      (TRYRULE (CAR RULES-TO-TEST))))
             (SETQ RULES-TO-TEST (CDR RULES-TO-TEST))
             (GO LOOP)))

(DEFUN TRYRULE (RULE)
    (PROG (CERTAIN)
          (SETQ CERTAIN (TESTIFS RULE))
          (COND ((> CERTAIN 0.)
                 (USETHEN RULE
                           (* CERTAIN
                              (RULE-CERT RULE)))
                 (RETURN (* CERTAIN
                             (RULE-CERT RULE))))
                (T
                 (RETURN 0.)))))

(DEFUN TESTIFS (RULE)
    (PROG (IFS CERTAIN RESULT)
          (SETQ IFS (CDADDR RULE))
          (COND ((UNDEDUCE IFS) (RETURN 0.)))
          (SETQ RESULT 1.)
     LOOP
          (COND ((NULL (CAR IFS))
                 (RETURN RESULT)))
          (SETQ CERTAIN (VERIFY (CAR IFS)))
          (COND ((> CERTAIN 0.)
                 (SETQ RESULT (* RESULT CERTAIN))
                 (SETQ IFS (CDR IFS))
                 (GO LOOP))
                (T
                 (RETURN 0.)))))

- 71 -
```

```
(DEFUN RECALL (FACT FCTS)
    (COND ((NULL FCTS) 0.)
          ((MATCH FACT
                  (CAR FCTS))
           (CAR (LAST-ELEMENT (CAR FCTS))))
          (T
           (RECALL FACT
                   (CDR FCTS)))))

(DEFUN REMEMBER (NEW)
    (COND ((MEMBER NEW FACTS) NIL)
          (T
           (SETQ FACTS (CONS NEW FACTS))
           NEW)))

(DEFUN INTHEN (FACT RULES)
    (COND ((NULL RULES) NIL)
          ((THENP FACT
                  (CAR RULES))
           (CONS (CAR RULES)
                 (INTHEN FACT
                         (CDR RULES))))
          (T
           (INTHEN FACT
                   (CDR RULES)))))

(DEFUN THENP (FACT RULE)
    (PROG (RL)
          (SETQ RL (CDR (CADDDR RULE)))
     LOOP
          (COND ((NULL RL) (RETURN NIL))
                ((MATCH FACT
                        (CAR RL))
                 (RETURN T))
                (T
                 (SETQ RL (CDR RL))
                 (GO LOOP)))))

(DEFUN USETHEN (RULE CERT-VALUE)
    (PROG (THENS VAL)
          (SETQ THENS (CDR (CADDDR RULE)))
     LOOP
```

- 72 -

```
        (COND ((NULL (CAR THENS))
               (RETURN CERT-VALUE))
              ((REMEMBER(SETQ VAL (REPLACE-CERTAINTY (CAR THENS)
                                                     CERT-VALUE)))
               (COND (PRTFLG
                       (P (LIST 'RULE
                                (CADR RULE)
                                'DEDUCES
                                VAL))
                       (TERPRI)))))
        (SETQ THENS (CDR THENS))
        (GO LOOP)))

(DEFUN ORED (LST)
    (PROG (CERT VAL)
        (SETQ VAL 1.)
    LOOP
        (COND ((NULL (CAR LST))
               (RETURN (- 1. VAL))))
        (SETQ CERT (- 1.
                      (VERIFY (CAR LST))))
        (SETQ VAL (* VAL CERT))
        (SETQ LST (CDR LST))
        (GO LOOP)))

(DEFUN REPLACE-CERTAINTY (CLAUSE VALUE)
    (PROG (TEMPRULE)
    LOOP
        (COND ((NULL (CDR CLAUSE))
               (RETURN (REVERSE (CONS (LIST VALUE)
                                      TEMPRULE))))
              (T
               (SETQ TEMPRULE (CONS (CAR CLAUSE)
                                    TEMPRULE))
               (SETQ CLAUSE (CDR CLAUSE))
               (GO LOOP)))))

(DEFUN RULE-CERT (RULE)
    (CAR (LAST-ELEMENT (CADR (CADDDR RULE)))))
```

Appendix 7

TRADITIONAL EXPERT SYSTEM CONTROL STRATEGY REASONING PROCESS

```
(ENTER PRINT MODE :)                    T
(WEAPON TYPE :)                         AGM-88
(WEAPON TYPE :)                         WASP
(WEAPON TYPE :)                         ERAM
(WEAPON TYPE :)                         MK-84H
(WEAPON TYPE :)                         NIL
(ENTER TARGET CLASSIFICATION :)         TANK FORMATION
(ENTER CERTAINTY OF TANK FORMATION)     .8
(ENTER TARGET CLASSIFICATION :)         SA-4
(ENTER CERTAINTY OF SA-4)               .2
(ENTER TARGET CLASSIFICATION :)         NIL
(ENTER TARGET RANGE IN METERS :)        6000
(ENTER AIRCRAFT ALTITUDE IN FEET :)     550
```

(RULE TARGET1 DEDUCES TARGET IS SAM .2)

(RULE CLASSIFY1 DEDUCES TARGET RADIATES .19)

(RULE MAXRNG2 DEDUCES MAXIMUM RANGE AGM-88 .916372129)

(RULE MINALT8 DEDUCES MINIMUM ALTITUDE AGM-88 1)

(RULE MAXALT4 DEDUCES MAXIMUM ALTITUDE AGM-88 1)

(RULE VERIFY2 DEDUCES VERIFIED AGM-88 .916372129)

(RULE CONSIDER1 DEDUCES CONSIDER AGM-88 .1566996341)

(RULE ASSIGN2 DEDUCES ASSIGN AGM-88 .1096897438)

(RULE CLASSIFY3 DEDUCES TARGET IS ARMOURED .798)

(RULE MAXRNG3 DEDUCES MAXIMUM RANGE WASP .6854717309)

(RULE MINALT4 DEDUCES MINIMUM ALTITUDE WASP 1)

(RULE MAXALT2 DEDUCES MAXIMUM ALTITUDE WASP 1)

(RULE VERIFY5 DEDUCES VERIFIED WASP .6854717309)

(RULE CONSIDER4 DEDUCES CONSIDER WASP .4923057971)

(RULE TGT3 DEDUCES MULTIPLE TARGETS .784)

(RULE ASSIGN6 DEDUCES ASSIGN WASP .3473709705)

- 74 -

(RULE ASSIGN7 DEDUCES ASSIGN WASP .344614058)

(RULE MAXRNG7 DEDUCES MAXIMUM RANGE ERAM .8210967437)

(RULE MINRNG3 DEDUCES MINIMUM RANGE ERAM 1)

(RULE MINALT5 DEDUCES MINIMUM ALTITUDE ERAM 1)

(RULE VERIFY6 DEDUCES VERIFIED ERAM .8210967437)

(RULE CONSIDER3 DEDUCES CONSIDER ERAM .5897116813)

(RULE TGT5 DEDUCES LOW-LEVEL DELIVERY .98)

(RULE ASSIGN4 DEDUCES ASSIGN ERAM .5284477141)

(RULE ASSIGN5 DEDUCES ASSIGN ERAM .4127981769)

ERAM

Result List
(ASSIGN ERAM (.5284477141))
(ASSIGN WASP (.3473709705))
(ASSIGN AGM-88 (.1096897438))

TRACE OF VERIFY FUNCTION IN TRADITIONAL CONTROL STRATEGY

1 ENTER VERIFY (ASSIGN AGM-88)
    2 ENTER VERIFY (CONSIDER AGM-88)
      3 ENTER VERIFY (TARGET RADIATES)
        4 ENTER VERIFY (OR (TARGET IS SAM) (TARGET IS EW/GCI RADAR VAN)
          (TARGET IS AIR DEFENCE CENTER) (TARGET IS GROUND JAMMER))
          5 ENTER VERIFY (TARGET IS SAM)
            6 ENTER VERIFY (OR (TARGET IS SA-4) (TARGET IS SA-6) (TARGET
              IS SA-13))
              7 ENTER VERIFY (TARGET IS SA-4)
              7 EXIT VERIFY .2
              7 ENTER VERIFY (TARGET IS SA-6)
              7 EXIT VERIFY 0.
              7 ENTER VERIFY (TARGET IS SA-13)
              7 EXIT VERIFY 0.

```
          6 EXIT VERIFY .2
         5 EXIT VERIFY .2
         5 ENTER VERIFY (TARGET IS EW/GCI RADAR VAN)
         5 EXIT VERIFY 0.
         5 ENTER VERIFY (TARGET IS AIR DEFENCE CENTER)
         5 EXIT VERIFY 0.
         5 ENTER VERIFY (TARGET IS GROUND JAMMER)
         5 EXIT VERIFY 0.
        4 EXIT VERIFY .2
      3 EXIT VERIFY .19
      3 ENTER VERIFY (VERIFIED AGM-88)
        4 ENTER VERIFY (MAXIMUM RANGE AGM-88)
          5 ENTER VERIFY (RANGE < 18500.)
          5 EXIT VERIFY .916372129
        4 EXIT VERIFY .916372129
        4 ENTER VERIFY (MINIMUM ALTITUDE AGM-88)
          5 ENTER VERIFY (ALTITUDE > 200.)
          5 EXIT VERIFY 1.
        4 EXIT VERIFY 1
        4 ENTER VERIFY (MAXIMUM ALTITUDE AGM-88)
          5 ENTER VERIFY (ALTITUDE < 33000.)
          5 EXIT VERIFY 1.
        4 EXIT VERIFY 1
      3 EXIT VERIFY .916372129
    2 EXIT VERIFY .1566996341
    2 ENTER VERIFY (OR (HIGH SENSITIVITY REQUIRED) (FAST REACTION TIME
    REQUIRED))
      3 ENTER VERIFY (HIGH SENSITIVITY REQUIRED)
        4 ENTER VERIFY (OR (TARGET IS SA-6) (TARGET IS SA-13))
          5 ENTER VERIFY (TARGET IS SA-6)
          5 EXIT VERIFY 0.
          5 ENTER VERIFY (TARGET IS SA-13)
          5 EXIT VERIFY 0.
        4 EXIT VERIFY 0.
      3 EXIT VERIFY 0.
      3 ENTER VERIFY (FAST REACTION TIME REQUIRED)
        4 ENTER VERIFY (OR (TARGET IS SA-6) (TARGET IS SA-13))
          5 ENTER VERIFY (TARGET IS SA-6)
          5 EXIT VERIFY 0.
          5 ENTER VERIFY (TARGET IS SA-13)
          5 EXIT VERIFY 0.
        4 EXIT VERIFY 0.
      3 EXIT VERIFY 0.
    2 EXIT VERIFY 0.
    2 ENTER VERIFY (CONSIDER AGM-88)
    2 EXIT VERIFY .1566996341
  1 EXIT VERIFY .1096897438
  1 ENTER VERIFY (ASSIGN WASP)
    2 ENTER VERIFY (CONSIDER WASP)
      3 ENTER VERIFY (TARGET IS ARMOURED)
        4 ENTER VERIFY (OR (TARGET IS TANK) (TARGET IS APC) (TARGET IS
        SAM))
          5 ENTER VERIFY (TARGET IS TANK)
          5 EXIT VERIFY .8
```

```
         5 ENTER VERIFY (TARGET IS APC)
         5 EXIT VERIFY 0.
         5 ENTER VERIFY (TARGET IS SAM)
         5 EXIT VERIFY .2
       4 EXIT VERIFY .84
     3 EXIT VERIFY .798
     3 ENTER VERIFY (VERIFIED WASP)
       4 ENTER VERIFY (MAXIMUM RANGE WASP)
         5 ENTER VERIFY (RANGE < 7000.)
         5 EXIT VERIFY .6854717309
       4 EXIT VERIFY .6854717309
       4 ENTER VERIFY (MINIMUM ALTITUDE WASP)
         5 ENTER VERIFY (ALTITUDE > 200.)
         5 EXIT VERIFY 1.
       4 EXIT VERIFY 1
       4 ENTER VERIFY (MAXIMUM ALTITUDE WASP)
         5 ENTER VERIFY (ALTITUDE < 33000.)
         5 EXIT VERIFY 1.
       4 EXIT VERIFY 1
     3 EXIT VERIFY .6854717309
   2 EXIT VERIFY .4923057971
   2 ENTER VERIFY (OR (MULTIPLE TARGETS) (STANDOFF DELIVERY))
     3 ENTER VERIFY (MULTIPLE TARGETS)
       4 ENTER VERIFY (TARGET IS TANK FORMATION)
       4 EXIT VERIFY .8
     3 EXIT VERIFY .784
     3 ENTER VERIFY (STANDOFF DELIVERY)
       4 ENTER VERIFY (RANGE < 1000.)
       4 EXIT VERIFY 0.
     3 EXIT VERIFY 0.
   2 EXIT VERIFY .784
   2 ENTER VERIFY (CONSIDER WASP)
   2 EXIT VERIFY .4923057971
 1 EXIT VERIFY .3473709705
 1 ENTER VERIFY (ASSIGN ERAM)
   2 ENTER VERIFY (CONSIDER ERAM)
     3 ENTER VERIFY (TARGET IS ARMOURED)
     3 EXIT VERIFY .798
     3 ENTER VERIFY (VERIFIED ERAM)
       4 ENTER VERIFY (MAXIMUM RANGE ERAM)
         5 ENTER VERIFY (RANGE < 10000.)
         5 EXIT VERIFY .8210967437
       4 EXIT VERIFY .8210967437
       4 ENTER VERIFY (MINIMUM RANGE ERAM)
         5 ENTER VERIFY (RANGE > 400.)
         5 EXIT VERIFY 1.
       4 EXIT VERIFY 1
       4 ENTER VERIFY (MINIMUM ALTITUDE ERAM)
         5 ENTER VERIFY (ALTITUDE > 150.)
         5 EXIT VERIFY 1.
       4 EXIT VERIFY 1
     3 EXIT VERIFY .8210967437
     3 ENTER VERIFY (TARGET IS UNARMOURED SOFT)
       4 ENTER VERIFY (OR (TARGET IS AIRCRAFT SHELTER) (TARGET IS POL
```

- 77 -

```
                    STORAGE) (TARGET IS AIRCRAFT OPEN) (TARGET IS SUPPLY TRUCK))
                 5 ENTER VERIFY (TARGET IS AIRCRAFT SHELTER)
                 5 EXIT VERIFY 0.
                 5 ENTER VERIFY (TARGET IS POL STORAGE)
                 5 EXIT VERIFY 0.
                 5 ENTER VERIFY (TARGET IS AIRCRAFT OPEN)
                 5 EXIT VERIFY 0.
                 5 ENTER VERIFY (TARGET IS SUPPLY TRUCK)
                 5 EXIT VERIFY 0.
               4 EXIT VERIFY 0.
             3 EXIT VERIFY 0.
         2 EXIT VERIFY .5897116813
         2 ENTER VERIFY (OR (MULTIPLE TARGETS) (LOW-LEVEL DELIVERY))
             3 ENTER VERIFY (MULTIPLE TARGETS)
             3 EXIT VERIFY .784
             3 ENTER VERIFY (LOW-LEVEL DELIVERY)
                 4 ENTER VERIFY (ALTITUDE < 600.)
                 4 EXIT VERIFY 1.
             3 EXIT VERIFY .98
         2 EXIT VERIFY .99568
         2 ENTER VERIFY (CONSIDER ERAM)
         2 EXIT VERIFY .5897116813
    1 EXIT VERIFY .5284477141
    1 ENTER VERIFY (ASSIGN MK-84H)
         2 ENTER VERIFY (CONSIDER MK-84H)
             3 ENTER VERIFY (TARGET IS HARD STRUCTURE)
                 4 ENTER VERIFY (OR (TARGET IS BUILDING) (TARGET IS BRIDGE) (
                    TARGET IS RUNWAY))
                     5 ENTER VERIFY (TARGET IS BUILDING)
                     5 EXIT VERIFY 0.
                     5 ENTER VERIFY (TARGET IS BRIDGE)
                         6 ENTER VERIFY (OR (TARGET IS HIGHWAY BRIDGE) (TARGET IS
                            RAILROAD BRIDGE))
                             7 ENTER VERIFY (TARGET IS HIGHWAY BRIDGE)
                             7 EXIT VERIFY 0.
                             7 ENTER VERIFY (TARGET IS RAILROAD BRIDGE)
                             7 EXIT VERIFY 0.
                         6 EXIT VERIFY 0.
                     5 EXIT VERIFY 0.
                     5 ENTER VERIFY (TARGET IS RUNWAY)
                     5 EXIT VERIFY 0.
                 4 EXIT VERIFY 0.
             3 EXIT VERIFY 0.
         2 EXIT VERIFY 0.
    1 EXIT VERIFY 0.
```

Appendix 8

TIME-CONSTRAINED EXPERT SYSTEM CONTROL STRATEGY REASONING PROCESS

```
(ENTER PRINT MODE :)                    T
(WEAPON TYPE :)                         AGM-88
(WEAPON TYPE :)                         WASP
(WEAPON TYPE :)                         ERAM
(WEAPON TYPE :)                         MK-84H
(WEAPON TYPE :)                         NIL
(TARGET CLASSIFICATION :)               TANK FORMATION
(ENTER CERTAINTY OF TANK FORMATION)     .8
(TARGET CLASSIFICATION :)               SA-4
(ENTER CERTAINTY OF SA-4)               .2
(TARGET CLASSIFICATION :)               NIL
(ENTER TARGET RANGE IN METERS :)        6000
(ENTER AIRCRAFT ALTITUDE IN FEET :)     550
(ENTER TIME CONSTRAINT :)               4
```

(RULE MAXRNG2 DEDUCES MAXIMUM RANGE AGM-88 .916372129)

(RULE VERIFY2 DEDUCES VERIFIED AGM-88 .7422614245)

(RULE CLASSIFY1 DEDUCES TARGET RADIATES .665)

(RULE CONSIDER1 DEDUCES CONSIDER AGM-88 .4442434626)

(RULE ASSIGN2 DEDUCES ASSIGN AGM-88 .3109704238)

(RULE ASSIGN1 DEDUCES ASSIGN AGM-88 .319855293)

(RULE MAXRNG3 DEDUCES MAXIMUM RANGE WASP .6854717309)

(RULE VERIFY5 DEDUCES VERIFIED WASP .3701547347)

(RULE CLASSIFY3 DEDUCES TARGET IS ARMOURED .665)

(RULE CLASSIFY3 DEDUCES TARGET IS ARMOURED .76)

(RULE CONSIDER4 DEDUCES CONSIDER WASP .2531858385)

(RULE ASSIGN7 DEDUCES ASSIGN WASP .177230087)

(RULE ASSIGN6 DEDUCES ASSIGN WASP .1595070783)

(RULE ASSIGN6 DEDUCES ASSIGN WASP .1367203528)

(RULE CONSIDER3 DEDUCES CONSIDER ERAM .5472)

(RULE ASSIGN5 DEDUCES ASSIGN ERAM .38304)

(RULE ASSIGN4 DEDUCES ASSIGN ERAM .344736)

- 79 -

(RULE ASSIGN4 DEDUCES ASSIGN ERAM .295488)

(RULE CONSIDER6 DEDUCES CONSIDER MK-84H .252)

(RULE ASSIGN10 DEDUCES ASSIGN MK-84H .1512)

ERAM

Result List (ASSIGN AGM-88 (.319855293))
(ASSIGN WASP (.1595070783))
(ASSIGN ERAM (.38304))
(ASSIGN MK-84H (.1512))

TRACE OF VERIFY FUNCTION IN TIME-CONSTRAINED INFERENCE STRATEGY

```
1 ENTER VERIFY (ASSIGN AGM-88)
  2 ENTER VERIFY (CONSIDER AGM-88)
    3 ENTER VERIFY (VERIFIED AGM-88)
      4 ENTER VERIFY (MAXIMUM ALTITUDE AGM-88)
      4 EXIT VERIFY .9
      4 ENTER VERIFY (MINIMUM ALTITUDE AGM-88)
      4 EXIT VERIFY .9
      4 ENTER VERIFY (MAXIMUM RANGE AGM-88)
        5 ENTER VERIFY (RANGE < 18500.)
        5 EXIT VERIFY .916372129
      4 EXIT VERIFY .916372129
    3 EXIT VERIFY .7422614245
    3 ENTER VERIFY (TARGET RADIATES)
      4 ENTER VERIFY (TARGET IS SAM)
      4 EXIT VERIFY .7
    3 EXIT VERIFY .665
  2 EXIT VERIFY .4442434626
  2 ENTER VERIFY (HIGH SENSITIVITY REQUIRED)
  2 EXIT VERIFY .8
  2 ENTER VERIFY (CONSIDER AGM-88)
  2 EXIT VERIFY .4442434626
1 EXIT VERIFY .319855293
1 ENTER VERIFY (ASSIGN WASP)
  2 ENTER VERIFY (CONSIDER WASP)
    3 ENTER VERIFY (VERIFIED WASP)
      4 ENTER VERIFY (MAXIMUM ALTITUDE WASP)
      4 EXIT VERIFY .9
```

```
        4 ENTER VERIFY (MINIMUM ALTITUDE WASP)
        4 EXIT VERIFY .6
        4 ENTER VERIFY (MAXIMUM RANGE WASP)
          5 ENTER VERIFY (RANGE < 7000.)
          5 EXIT VERIFY .6854717309
        4 EXIT VERIFY .6854717309
      3 EXIT VERIFY .3701547347
      3 ENTER VERIFY (TARGET IS ARMOURED)
        4 ENTER VERIFY (TARGET IS SAM)
        4 EXIT VERIFY .7
        4 ENTER VERIFY (TARGET IS TANK)
        4 EXIT VERIFY .8
      3 EXIT VERIFY .76
    2 EXIT VERIFY .2531858385
    2 ENTER VERIFY (MULTIPLE TARGETS)
    2 EXIT VERIFY .7
    2 ENTER VERIFY (CONSIDER WASP)
    2 EXIT VERIFY .2531858385
    2 ENTER VERIFY (STANDOFF DELIVERY)
    2 EXIT VERIFY .6
    2 ENTER VERIFY (CONSIDER WASP)
    2 EXIT VERIFY .2531858385
  1 EXIT VERIFY .177230087
  1 ENTER VERIFY (ASSIGN ERAM)
    2 ENTER VERIFY (CONSIDER ERAM)
      3 ENTER VERIFY (VERIFIED ERAM)
      3 EXIT VERIFY .8
      3 ENTER VERIFY (TARGET IS UNARMOURED SOFT)
      3 EXIT VERIFY 0.
      3 ENTER VERIFY (VERIFIED ERAM)
      3 EXIT VERIFY .8
      3 ENTER VERIFY (TARGET IS ARMOURED)
      3 EXIT VERIFY .76
    2 EXIT VERIFY .5472
    2 ENTER VERIFY (MULTIPLE TARGETS)
    2 EXIT VERIFY .7
    2 ENTER VERIFY (CONSIDER ERAM)
    2 EXIT VERIFY .5472
    2 ENTER VERIFY (LOW-LEVEL DELIVERY)
    2 EXIT VERIFY .6
    2 ENTER VERIFY (CONSIDER ERAM)
    2 EXIT VERIFY .5472
  1 EXIT VERIFY .38304
  1 ENTER VERIFY (ASSIGN MK-84H)
    2 ENTER VERIFY (CONSIDER MK-84H)
      3 ENTER VERIFY (VERIFIED MK-84H)
      3 EXIT VERIFY .7
      3 ENTER VERIFY (TARGET IS HARD STRUCTURE)
      3 EXIT VERIFY .4
    2 EXIT VERIFY .252
  1 EXIT VERIFY .1512
```

- 81 -

We claim:

1. A control process for an expert system implemented with a computer system, wherein said expert system includes an inference network comprising a plurality of inference nodes each representing a predetermined proposition, said inference nodes being respectively coupled to one another in accordance with a plurality of predetermined inference rules to form said inference network, wherein each of said inference nodes is assigned a merit value based on a processing cost for calculating with said computer system a likelihood value of the likelihood of the proposition which said inference node represents, said control process comprising:

selecting nodes of said inference network for processing to determine said likelihood values for said nodes in accordance with the respective merit values of said nodes so that those nodes having greater merit values will be processed before nodes having smaller merit values; and limiting the total number of nodes selected for processing in accordance with a predetermined constraint.

2. A control process according to claim 1, wherein said predetermined constraint is a real time constraint so that the total number of nodes selected for processing will be limited to the number of nodes which can be processed within a predetermined real-time.

3. A control process according to claim 2, wherein said processing cost represents a real-time value required for said computer system to calculate said likelihood value.

4. A control process according to claim 1, wherein said predetermined constraint is a processor time constraint so that the total number of nodes selected will be limited to the number of nodes which can be processed within a predetermined processor time.

5. A control process according to claim 4, wherein said processing cost represents a processor time required by said computer system to calculate said likelihood value.

6. A control process according to claim 1, wherein said predetermined constraint is a predetermined limit on the total number of nodes which can be processed.

7. A control process according to claim 1, further comprising the steps of assigning each of said nodes an initial estimate default likelihood value to be used in determining initial merit values for each node and recalculating merit values for a predetermined node and all nodes whose likelihood values will be effected by changes in the likelihood value of the predetermined node whenever an updated likelihood value is calculated for said predetermined node based on input data provided to the computer system.

8. A control process for an expert system implemented with a computer system, wherein said expert system includes an inference network having a plurality of inference nodes each representing a predetermined proposition, said inference nodes being respectively coupled to one another in accordance with a plurality of predetermined inference rules to form a network having predetermined top nodes representing basic propositions and antecedent nodes which will affect the calculation of a likelihood value of the likelihood of the basic proposition of the top nodes to which they are connected, wherein each of said antecedent inference nodes is assigned a merit value which represents a ratio between (1) the amount of an effect which a change of a likelihood value representing a likelihood of said antecedent inference node will have on the likelihood value of a top node which it is connected to and (2) a processing cost for calculating said likelihood value for said antecedent node with said computer system, and wherein each of said top nodes is assigned a merit value based on a processing cost for calculating the likelihood value for said top node with said computer system, said control process comprising:

selecting antecedent nodes and top nodes of said inference network for processing to determine said likelihood values for said antecedent and top nodes in accordance with the respective merit values of said nodes so that those nodes having greater merit values will be processed before nodes having smaller merit values; and limiting the total number of antecedent and top nodes selected for processing in accordance with a predetermined constraint.

9. A control process according to claim 8, wherein said predetermined constraint is a real time constraint so that the total number of nodes selected for processing will be limited to the number of nodes which can be processed within a predetermined real-time.

10. A control process according to claim 9, wherein said processing cost represents a real-time value required for said computer system to calculate said likelihood value.

11. A control process according to 10, further comprising the steps of assigning each of said nodes an initial estimate default likelihood value to be used in determining initial merit values for each node and recalculating merit values for a predetermined node and all nodes whose likelihood values will be effected by changes in the likelihood value of the predetermined node whenever an updated likelihood value is calculated for said predetermined node based on input data provided to the computer system.

12. A control process according to claim 8, wherein said predetermined constraint is a processor time constraint so that the total number of nodes selected will be limited to the number of nodes which can be processed within a predetermined processor time.

13. A control process according to claim 12, wherein said processing cost represents a processor time required by said computer system to calculate said likelihood value.

14. A control process according to claim 8, wherein said predetermined constraint is a predetermined limit on the total number of nodes which can be processed.

15. A control process according to claim 8, further comprising the steps of assigning each of said nodes an initial estimate default likelihood value to be used in determining initial merit values for each node and recalculating merit values for a predetermined node and all nodes whose likelihood values will be effected by changes in the likelihood value of the predetermined node whenever an updated likelihood value is calculated for said predetermined node based on input data provided to the computer system.

* * * * *